United States Patent
Sika

(10) Patent No.: US 10,345,374 B2
(45) Date of Patent: Jul. 9, 2019

(54) SYSTEM AND METHODS FOR ANALYZING AND ESTIMATING SUSCEPTIBILITY OF CIRCUITS TO RADIATION-INDUCED SINGLE-EVENT-EFFECTS

(71) Applicant: LUCID CIRCUIT, INC., Santa Monica, CA (US)

(72) Inventor: Michel D Sika, Santa Monica, CA (US)

(73) Assignee: LUCID CIRCUIT, INC., Santa Monica, CA (US)

(*) Notice: Subject to any disclaimer, the term of this patent is extended or adjusted under 35 U.S.C. 154(b) by 0 days.

(21) Appl. No.: 16/041,165

(22) Filed: Jul. 20, 2018

(65) Prior Publication Data

US 2018/0328983 A1    Nov. 15, 2018

Related U.S. Application Data

(63) Continuation of application No. 15/823,231, filed on Nov. 27, 2017, now Pat. No. 10,048,313, which is a continuation of application No. 15/628,271, filed on Jun. 20, 2017, now Pat. No. 9,857,415.

(60) Provisional application No. 62/352,834, filed on Jun. 21, 2016.

(51) Int. Cl.
*G06F 17/50* (2006.01)
*G01R 31/28* (2006.01)

(52) U.S. Cl.
CPC ..... *G01R 31/2855* (2013.01); *G01R 31/2849* (2013.01); *G06F 17/5036* (2013.01); *G06F 17/5068* (2013.01); *G06F 2217/10* (2013.01)

(58) Field of Classification Search
None
See application file for complete search history.

(56) References Cited

U.S. PATENT DOCUMENTS

| | | | |
|---|---|---|---|
| 8,397,191 B1 | 3/2013 | Lesea | |
| 9,857,415 B1 * | 1/2018 | Sika | G01R 31/2855 |
| 10,048,313 B2 * | 8/2018 | Sika | G01R 31/2855 |
| 2008/0016477 A1 | 1/2008 | Kleinosowski | |
| 2012/0182048 A1 | 7/2012 | Eaton | |
| 2017/0117895 A1 | 4/2017 | Clark | |

* cited by examiner

*Primary Examiner* — Hoon K Song
(74) *Attorney, Agent, or Firm* — Shant Tchakerian

(57) ABSTRACT

Systems and methods for semiconductor design evaluation. IC layout information of a circuit design is received, and the circuit design is decomposed into smaller circuit pieces. Each circuit piece has IC layout information and a netlist. For each circuit piece, a set of strike models is selected based on the layout information and the net-list of the circuit piece and received radiation environment information. Each strike model has circuit components with voltage values corresponding to a respective particle strike. For each selected strike model of a circuit piece: a radiation susceptibility metric is determined by comparing functional results of simulation of the of the strike model with functional results of simulation of the circuit piece. For each circuit piece, a radiation susceptibility metric is determined based on the radiation susceptibility metrics generated for each selected strike model of the circuit piece.

2 Claims, 16 Drawing Sheets

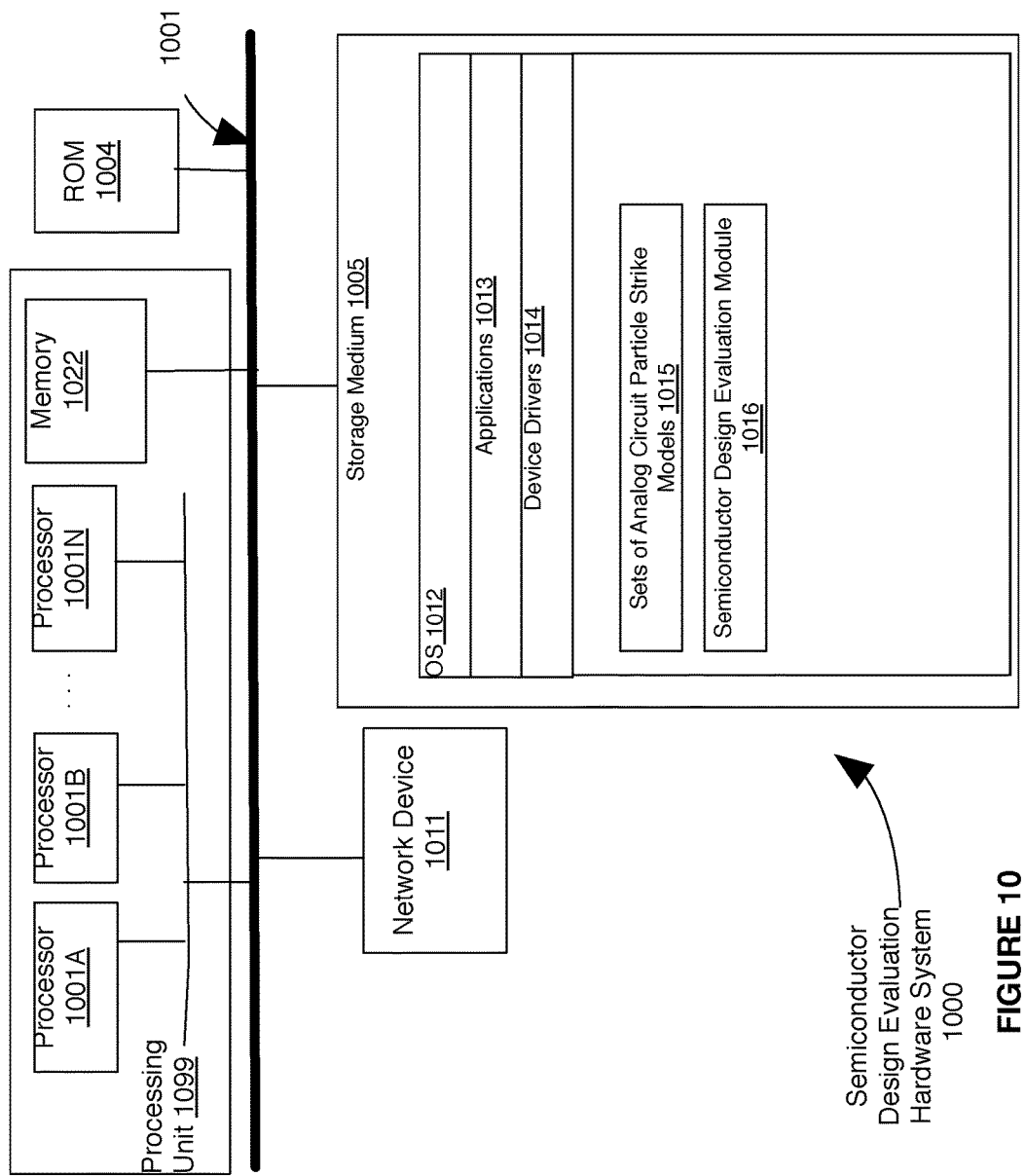

SYSTEM AND METHODS FOR ANALYZING AND ESTIMATING SUSCEPTIBILITY OF CIRCUITS TO RADIATION-INDUCED SINGLE-EVENT-EFFECTS

CROSS-REFERENCE TO RELATED APPLICATIONS

This application is a continuation of U.S. application Ser. No. 15/823,231, filed 27 Nov. 2017, which is a continuation of U.S. application Ser. No. 15/628,271, filed 20 Jun. 2017, which claims the benefit of U.S. Provisional Application Ser. No. 62/352,834, filed on 21 Jun. 2016, all of which are incorporated in their entirety by this reference.

TECHNICAL FIELD

The present disclosure relates to analyzing and predicting the radiation-induced single-event-effects susceptibility of microelectronics during the design process.

BACKGROUND

The engineering effort and cost required for developing and validating radiation-induced single-event-effects tolerant microelectronics in modern technology nodes are increasing with every new technology node.

BRIEF DESCRIPTION OF THE FIGURES

FIG. 10 is a diagram depicting system architecture of a semiconductor design evaluation hardware system in accordance with embodiments.

DETAILED DESCRIPTION

1. Overview

Figure 1:
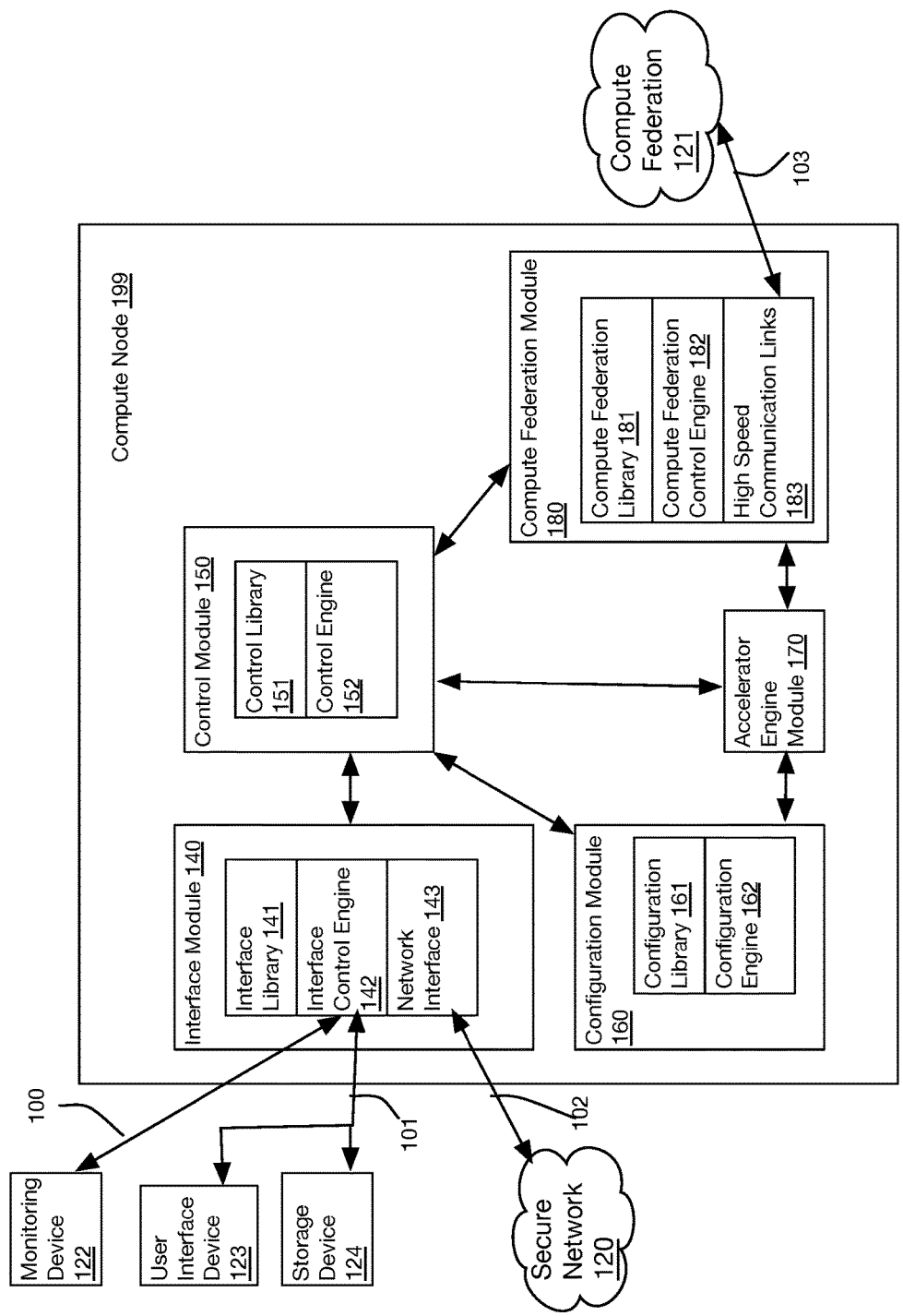
FIG. 1 shows a schematic block diagram of compute node in accordance with embodiments.

The engineering effort and cost required for developing and validating radiation-induced single-event-effects tolerant microelectronics in modern technology nodes are increasing with every new technology node. Ensuring the resiliency of microelectronics to radiation-induced single-event-effects has long been a concern and challenge mostly reserved for space applications. With the advent of high-density, low-power, sub-20 nm technology processes and the forthcoming quasi-ubiquitous use of these technology processes in new microelectronic designs, some with tens of billions of transistor gates, across all industries, there is a considerable risk to the costs, development cycle duration, efficiency and resiliency of new designs for terrestrial applications.

Specifically, the significant investment in time and effort for implementing typical radiation mitigation strategies is of particular concern. While newer technology nodes enable the design of larger, more complex and more powerful microelectronics applications, the delays required for the addition of radiation mitigation strategies increases asymmetrically. By the time a system with hardened microelectronics enters service, the technology node employed may no longer be modern, resulting in a high-cost product that is not competitive when compared to newer technology nodes. The significant scheduling risks brought about by hardening microelectronics to radiation effects might either force the limiting of desirable features implemented in critical systems, or present considerable risks to the timely deployment of critical systems. While such constraints are typical and are routinely taken into consideration in the budgets and schedules of high-end specialized designs such as those that target space applications, for new designs developed for the terrestrial commercial industry for instance, the engineering efforts and costs might prove non-tractable. When considering that radiation hardening is validated upon design fabrication, and that several design cycles might be required, the availability window of the employed technology node from semiconductor vendors might be significantly reduced by the time critical systems enter in to production. To ensure strategic advantage and competitiveness, it is helpful to reduce the delay for implementing radiation tolerant microelectronics for all applications. To this end, a reliable assessment of radiation susceptibility prior to fabrication is desirable.

Assessing radiation effects in microelectronics prior to fabrication currently broadly falls in to two approaches: physics based modeling simulations and fault injection simulations. Both approaches have limitations in assessing or predicting radiation effects on the scale of an entire microelectronics chip design.

Physics based modeling simulation tools are capable of assessing the resiliency on a scale ranging from individual microelectronic gates up to small circuits. This approach, while computationally intensive, achieves a high degree of precision on small circuits. The computational requirements for applying this approach to an entire microelectronics chip design are not practical.

Fault injection simulation allows for some very limited a priori validation of radiation mitigation capabilities without considering semiconductor technology properties, physical design properties and charge deposition physics. This purely functional approach injects faults in the form of "bit flipping", that is the inversion of the logic levels within the components of a design in order to simulate radiation effects. This approach can be applied to much larger circuits than with the physics based modeling approach. While this approach has the potential to cover an entire microelectronics chip design, physical aspects of the design and properties related to charge deposition are not typically taken into consideration.

With both of the aforementioned approaches, it is often necessary to fabricate and test a design in a radiation environment in order to assess the performance of any implemented mitigation strategies. Furthermore, both approaches typically lack a direct means for reliable, direct correlation of the resiliency performance for a fabricated design to the effectiveness and contribution of specific mitigation implementations applied to specific regions of said design.

According to aspects of embodiments described herein:

areas of a microelectronics design that are vulnerable to single-event-effects prior to fabrication are identified;

a susceptibility assessment of areas of a microelectronics design that are vulnerable to single-event-effects prior to fabrication is provided; and overall susceptibility assessment and resiliency to single-event effects prediction for a microelectronics design prior to fabrication is provided.

By virtue of aspects of the embodiments described herein:

the engineering effort requirements for implementing single-event-effects resilient microelectronics designs may be reduced;

the development costs required for implementing reliable single-event-effects resilient microelectronics designs may be reduced;

the development duration and risk for developing reliable single-event-effects resilient microelectronics designs may be reduced;

the development of reliable single-event-effects resilient microelectronics devices that optimally balance the area reduction, power savings and speedup benefits of a modern technology process node with the necessary single-event-effects resiliency requirements may be enabled;

the development of targeted radiation assessment testing plans ahead of microelectronic design fabrication may be enabled;

the retroactive development of targeted radiation assessment testing plans for microelectronics devices that have already undergone fabrication may be enabled;

testing costs and duration for assessing the resiliency performance of fabricated radiation tolerant microelectronic devices may be reduced; and the risk, interval-delay and number of necessary engineering-sample fabrication cycles to develop radiation tolerant microelectronics devices may be reduced.

Embodiments herein perform the aforementioned on designs ranging from small to very large in overall gate count.

In some embodiments, radiation-induced single-event-effects susceptibility of microelectronics are analyzed and predicted during the design process for microelectronic designs having gate counts ranging from several hundred gates to several billion gates.

In some embodiments, radiation-induced single-event-effects susceptibility of microelectronics are analyzed and predicted during the design process for microelectronic designs having gate counts in the order of tens of billions (e.g., designs for reconfigurable gate array circuit devices and graphics processing unit circuit devices).

2. Overview of Hardware Compute Accelerator Embodiments

Systems and methods for a hardware compute accelerator (compute node 199 of FIG. 1) (sometimes referred to herein as "platform" and "computing system"). In some embodiments, the accelerator 199 includes an interface module circuit 140 that is constructed to receive user commands, configuration parameters, and first microelectronic design data for at least a first microelectronic design from at least one of a first external system (e.g., via the secure network 120 of FIG. 1) and a user interface device (e.g., one of the user interface devices coupled to the accelerator 199 via the port 101 of FIG. 1), wherein the first microelectronic design data includes: design netlist and layout information, technology parameters, radiation environment parameters, and characteristic stimuli. In some embodiments, the accelerator 199 includes a control module circuit 150 that is constructed to, responsive to the first microelectronic design data provided by the interface module circuit, determine whether to provide at least a first portion of the first micro-electronic design data to at least one of a first accelerator engine module circuit 170 of the accelerator 199 and a second accelerator engine module circuit of a second accelerator external to the accelerator 199 based on the first microelectronic design data, and provide the first portion of the micro-electronic design data based on the determination. In some embodiments, the accelerator 199 includes a configuration module circuit 160 that is constructed to, responsive to information provided by the control module circuit 150 indicating that the control module circuit 150 has allocated the accelerator engine module circuit to process the first portion of the first micro-electronic design data, configure the accelerator engine module circuit and control the accelerator engine module circuit to perform processing of the first portion of the microelectronic design data. In some embodiments, the accelerator 199 includes the accelerator engine module circuit (e.g., 170 of FIG. 1), which is constructed to, responsive to receiving the first portion of the first microelectronic design data, process the first portion by: performing radiation-effects susceptibility analysis and prediction for the first data, generating radiation-effects susceptibility analysis and prediction results, and providing the generated results to the control module circuit 150, wherein the control module circuit 150 provides the generated results to at least one of the first external system (e.g., via the secure network 120 of FIG. 1) and the user interface device (e.g., one of the user interface devices coupled to the accelerator via the port 101 of FIG. 1) via the interface control module circuit 140. In some embodiments, the interface module circuit 140 is communicatively coupled to the control module circuit 150 and at least one of the first external system (e.g., via the secure network 120 of FIG. 1) and the user interface device (e.g., one of the user interface devices coupled to the accelerator via the port 101 of FIG. 1). In some embodiments, the control module circuit 150 is communicatively coupled to the configuration module circuit 160, and the accelerator engine module circuit (e.g., 170). In some embodiment, the accelerator engine module circuit is communicatively coupled to the configuration module circuit 160.

Figure 6:
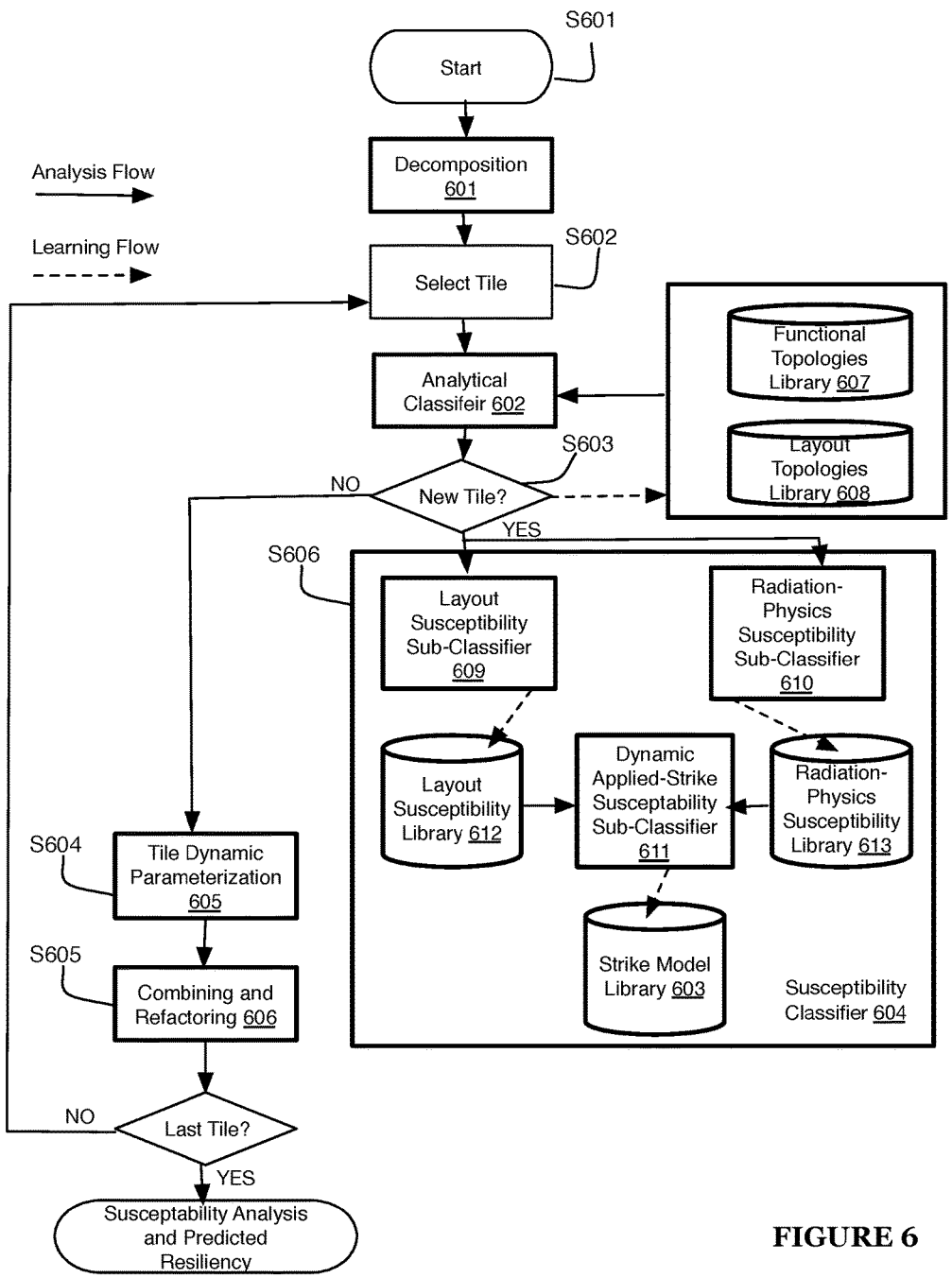
FIG. 6 is a representation of a method in accordance with embodiments.

In some embodiments, the generated results include the results generated by the process S605 described herein with respect to FIG. 6. In some embodiments, the generated results include the results generated by the process S804 described herein with respect to FIG. 8B. In some embodiments, the generated results include the results generated by the process S806 described herein with respect to FIG. 8C. In some embodiments, the generated results include the results generated by the process S808 described herein with respect to FIG. 8D.

In some embodiments, the hardware compute accelerator 199 includes a compute federation module circuit 180. In some embodiments, the control module circuit 150 is communicatively coupled to the compute federation module circuit 180. In some embodiments, the accelerator engine module circuit is communicatively coupled to the compute federation module circuit 180 In some embodiments, the compute federation module circuit 180 is communicatively coupled to at least a first external hardware compute accelerator (e.g., via a compute federation 121). In some embodiments, the compute federation module circuit 180 is constructed to: provide the first portion of the micro-electronic design data to the second accelerator engine module circuit of the second accelerator external to the accelerator 199 responsive to a determination by the control module circuit 150 to provide the first portion to the second accelerator engine module circuit, and provide results generated by the second accelerator engine module circuit to the control module circuit 150.

In some embodiments, the interface module circuit 140 is communicatively coupled to at least the second external hardware compute accelerator (e.g., via a secure network 120), and the interface module circuit 140 is constructed to provide the first portion of the micro-electronic design data to the second accelerator engine module circuit of the second accelerator external to the accelerator 199 responsive to a determination by the control module circuit 150 to provide the first portion to the second accelerator engine module circuit, and provide results generated by the second accelerator engine module circuit to the control module circuit 150.

In some embodiments, the control module circuit 150 receives second microelectronic design data provided by the compute federation module circuit 180. In some embodiments, the second microelectronic design data is provided by another accelerator via the compute federation module circuit 180.

In some embodiments, the control module circuit 150 receives the first microelectronic design data via the compute federation module circuit 180. In some embodiments, the first microelectronic design data is provided by another accelerator via the compute federation module circuit 180.

In some embodiments, the control module circuit 150 receives a plurality of generated radiation-effects susceptibility analysis and prediction results, and provides the generated results to at least one of the first external system (e.g., via the secure network 120 of FIG. 1) and the user interface device (e.g., one of the user interface devices coupled to the accelerator via the port 101 of FIG. 1) via the interface control module circuit 140. In some embodiments, the control module circuit 150 receives processes each generated result and provides the processed generated results to at least one of the first external system (e.g., via the secure network 120 of FIG. 1) and the user interface device (e.g., one of the user interface devices coupled to the accelerator via the port 101 of FIG. 1) via the interface module circuit 140.

In some implementations, the accelerator engine module circuit (e.g., 170) provides the generated results to the control module circuit 150 directly. In some implementations, the accelerator engine module circuit provides the generated results to the control module circuit 150 via a compute federation module circuit 180. In some implementations, the accelerator engine module circuit provides the generated results to the control module circuit 150 via the configuration module circuit 160.

In some implementations, the configuration module circuit 150 configures the accelerator engine module circuit and controls the accelerator engine module circuit to perform processing of the first portion of the microelectronic design data based on configuration information included in the first portion. In some implementations, the configuration module circuit 160 configures the accelerator engine module circuit and controls the accelerator engine module circuit to perform processing of the first portion of the microelectronic design data based on configuration information received by the interface module circuit 140.

In some embodiments, the data includes: configuration and parameterization information from a user as well as the microelectronics design properties of logical description, expected run-time stimuli, design layout physical properties, design topology physical properties, semiconductor technology charge deposition and charge sharing physics.

In some embodiments, the accelerator 199 is an ASIC (Application Specific Integrated Circuit). In some embodiments, the accelerator 199 is a hardware circuit that includes at least one FPGA (Field Programmable Gate Array). In some embodiments, the accelerator 199 is a hardware circuit that includes at least one (CGRA) Coarse-Grained Reconfigurable Array. In some embodiments, the accelerator 199 is a hardware circuit that includes at least one GPU (Graphics Processing Unit).

In some embodiments, the control module circuit 150 implements a load managing protocol that continuously ascertains the processing load of the accelerator engine module circuit. In some embodiments, the control module circuit 150 communicatively couples to other control module circuits (via one of the interface module circuit 140 and the compute federation module circuit 180), in order to obtain and conversely multicast or unicast information on the processing load of respective discrete accelerator engine module circuits coupled to the respective control modules circuits (e.g., of other hardware compute accelerators). In some embodiments, the communicatively coupled control module circuits distribute load according to the distributed accelerator engine module circuit loads. In some embodiments, a discrete control module circuit generates processing tasks for coupled accelerator engine module circuits through an analysis of boundary conditions and transmitted load parameters pertaining to the load distribution assigned to the control module circuit.

3. Description of the Figures

FIG. 1 depicts a compute node 199 (also referred to herein as "computing system" "platform" and "hardware compute accelerator") for performing radiation-induced single-event-effects resiliency estimation and analysis on microelectronic designs.

In some embodiments, the compute node 199 includes a display port 100 for a visual monitoring device 122, a set of serial ports 101 for one or more of a user interface device 123 (such as a computer keyboard input device and a hand control pointing device) and an external data storage medium 124, one or more computer networking port 102 and one or more high speed communication link 103. In some embodiments, the Interface Module 140 serves as a primary user interface for the compute node 199. In some embodiments, the Interface Module 140 receives commands from a user device (e.g., a user input device, an external computing device, a mobile device, and the like) as well as configuration parameters and data to be processed by the compute node 199. The data to be processed by the compute node 199 includes Design Netlist & layout Information, Technology Parameters, Radiation Environment Parameters and Characteristic Stimuli. In some embodiments, the Interface Control Engine 142 includes one or more microprocessor and microcontroller devices. In some embodiments, the Interface Library 141 includes one or more random access memory devices and one or more non-volatile data storage devices. In some embodiments, the Network Interface 143 includes circuitry that is constructed for communicating with a computer network. In some embodiments, the Interface Module 140 includes support and interfacing circuitry to enable the functional cohesion between the Interface Library 141, the Interface Control Engine 142 and the Network Interface 143. In some embodiments, the Interface Control Engine 142 performs preliminary processing of the data given by the user device (not shown) by leveraging program data stored in the Interface Library 141 and operating parameters provided by the user device. In some embodiments, the Control Module 150 includes a Control Engine 152 and Control Library 151. In some embodiments, the Control Library 151 contains one or more random access memory devices and one or more non-volatile data storage devices. In some embodiments, the Control Engine 152 contains one or more microprocessor, one or more microcontroller, one or more Field Programmable Gate Array (FPGA) and one or more Graphics Processing Unit (GPU). In some embodiments, the Control Module 150 contains supporting circuitry. In some embodiments, the Control Module 150 performs Load Distribution Partitioning and allocates compute task loads either to the Accelerator Engine 170, or to another Compute Node in a Compute Federation 121 through the Compute Federation Module 180, or to another Compute Node in a Networked Compute Configuration on a secure computer network 120 through the Compute Interface Module 140. The Control Engine 152 leverages the program data stored in the Control Library 151 to perform the necessary compute task allocation computations informed by the preliminary processing performed by the Interface Module 140. The Configuration Module 160, as informed by the Control Module 150 tailors the configuration and operation of the Accelerator Engine Module 170 to the task load allocated by the Control Module 150. The Configuration Module 160 contains a Configuration Engine 162 and a Configuration Library 161. In some embodiments, the Configuration Library 161 contains one or more random access memory devices and one or more non-volatile data storage devices. In some embodiments, the Configuration Engine 162 contains one or more microprocessor and one or more microcontroller. In some embodiments, the Configuration Module 160 contains any necessary supporting circuitry. In some embodiments, the Accelerator Engine Module 170 contains any number of Field Programmable Gate Arrays (FPGA) and any number of Graphics Processing Unit (GPU). In some embodiments, the Accelerator Engine Module 170 is an ASIC (Application Specific Integrated Circuit). In some embodiments, the Accelerator Engine Module 170 is a hardware circuit that includes at least one FPGA (Field Programmable Gate Array). In some embodiments, the Accelerator Engine Module 170 is a hardware circuit that includes at least one (CGRA) Coarse-Grained Reconfigurable Array. In some embodiments, the Accelerator Engine Module 170 is a hardware circuit that includes at least one GPU (Graphics Processing Unit). The Accelerator Engine Module 170 performs the computations required for radiation-effects susceptibility analysis and prediction. The Compute Federation Module 180 serves as an access controller for high bandwidth load distribution between Accelerator Engine Modules 170 across multiple compute nodes as directed by the Control Module 150. The Compute Federation Module 180 includes the Compute Federation Interface Library 181, a Compute Federation Control Engine 181 and High Speed Commercialization Links 183 along with any necessary supporting circuitry. In some embodiments, the Compute Federation Interface Library 181 contains one or more random access memory devices and one or more non-volatile data storage devices along with the necessary communication protocols for the operation of the Compute Federation Module 180. In some embodiments, the Compute Federation Control Engine 182 contains one or more microprocessor or microcontroller and one or more Field Programmable Gate Array (FPGA).

In some embodiments (Modular Compute Configuration), the constituent components of the compute node 199 are organized as interconnected standalone modules with any number of the following: Interface Module 140, the Control Module 150, the Configuration Module 160, the Accelerator Engine Module 170 and Compute Federation Module 180. In such embodiments, each module additionally contains one or more microcontroller and any of the following or other interface ports: a set of serial ports for user interface devices such as a computer keyboard input device and a hand control pointing device, one or more computer networking port and one or more high speed communication link.

Figure 2:
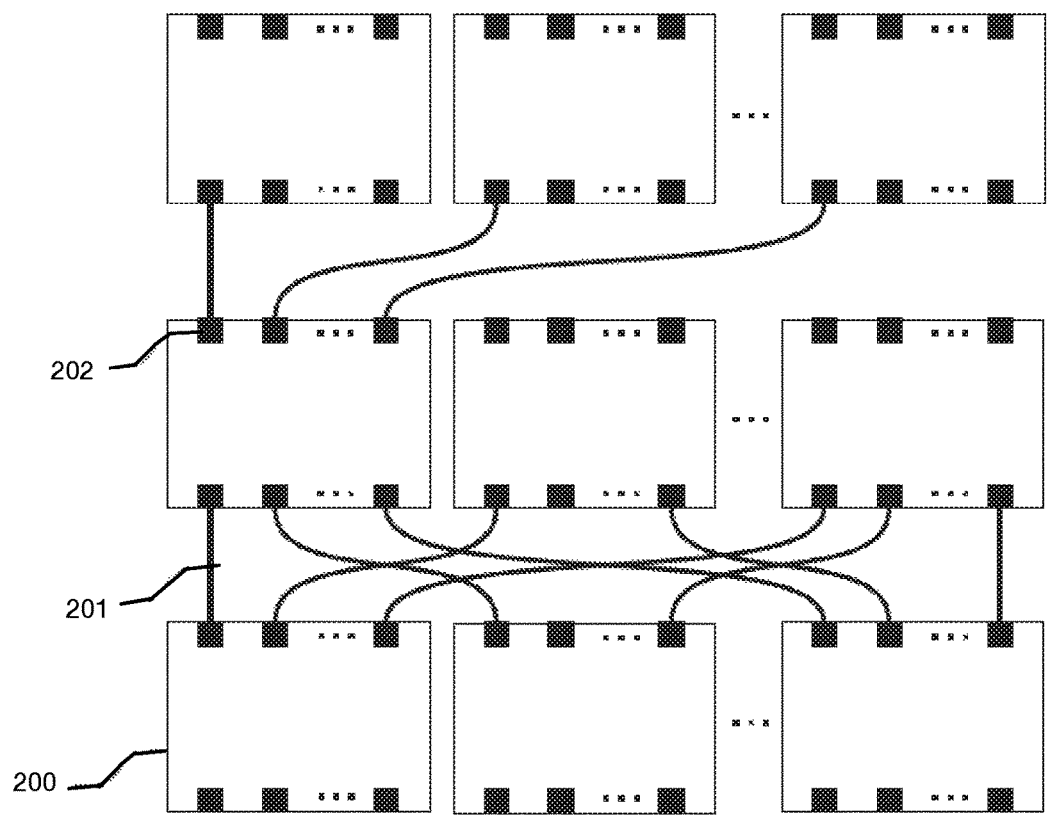
FIG. 2 shows a schematic diagram of a compute federation in accordance with embodiments.

Reference is now made to FIG. 2. In some embodiments (Compute Federation Configuration), two or more compute nodes (e.g., the compute node 200) are interconnected by the aforementioned High Speed Communication Link ports (e.g., port 202) via a high speed data networking medium (e.g., 201). In some embodiments, the High Speed Communication Link ports of FIG. 2 are similar to the High Speed Communication Link ports 183 of FIG. 1. In some embodiments, each high speed networking medium is similar to the high speed communication link 103 of FIG. 1. In some embodiments, each compute node of FIG. 2 is similar to the compute node 199 of FIG. 1.

Figure 3:
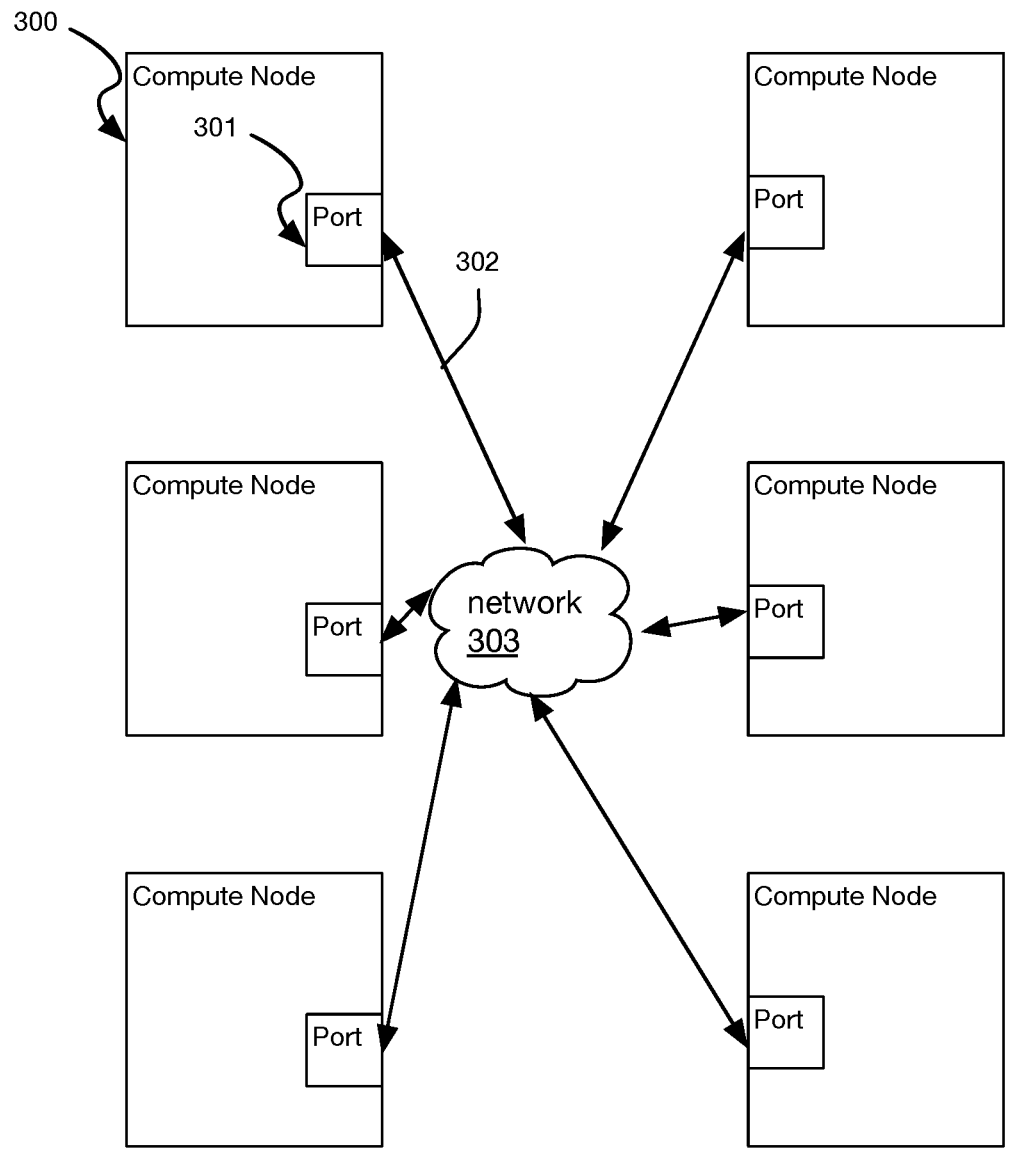
FIG. 3 shows a schematic diagram of a networked compute configuration in accordance with embodiments.

Reference is now made to FIG. 3. In some embodiments (Networked Compute Configuration), a plurality of compute nodes (e.g., 300) are interconnected through a Computer Network Interface port (e.g., 301) and a connection (e.g., 302) over a computer network 303 that employs the Internet protocol suite. In some embodiments, each computer network interface port is similar to the port 102 of FIG. 1. In some embodiments, each compute node of FIG. 3 is similar to the compute node 199 of FIG. 1. In some embodiments, the computer network 303 is similar to the computer network 120 of FIG. 1.

Figure 4:
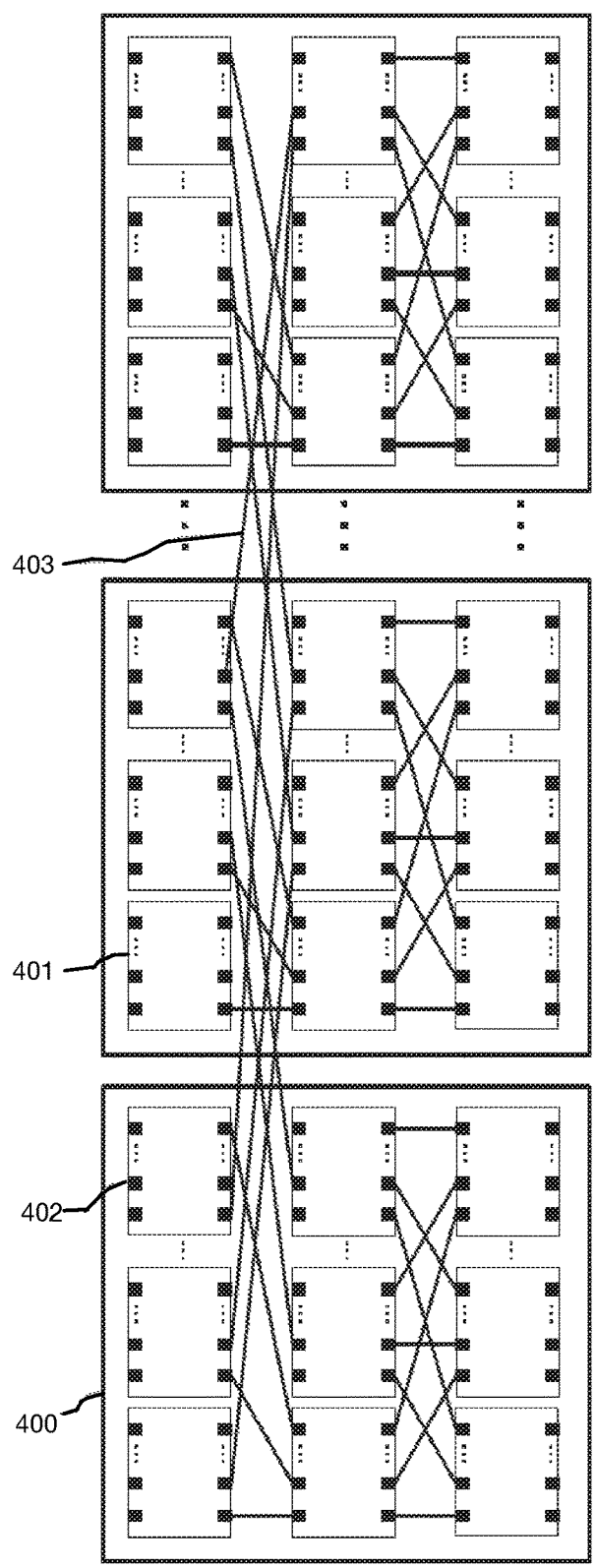
FIG. 4 shows a schematic diagram of a clustered compute configuration in accordance with embodiments.

Reference is now made to FIG. 4. In some embodiments (Clustered Compute Configuration), several instances of a Compute Federation Configuration (e.g., 400) (e.g., the system of FIG. 2) are organized as clusters that are interconnected by High Speed Communication Link ports 402 through appropriate high speed data networking medium 403 on pairs of individual compute nodes (e.g., 401) from each Compute Federation Configuration 400.

In some embodiments (Hybrid Compute Configuration), arbitrary arrangements comprised of any number compute nodes (e.g., 199 of FIG. 1) are interconnected with any number of Compute Federation Configurations (e.g., the system of FIG. 2), Networked Compute Configurations (e.g., the system of FIG. 3) and Clustered Compute Configurations (e.g., the system of FIG. 4) along with other high performance computing machines interconnected across a single local computer network or several remote computer networks that employs the Internet protocol suite.

Figure 5:
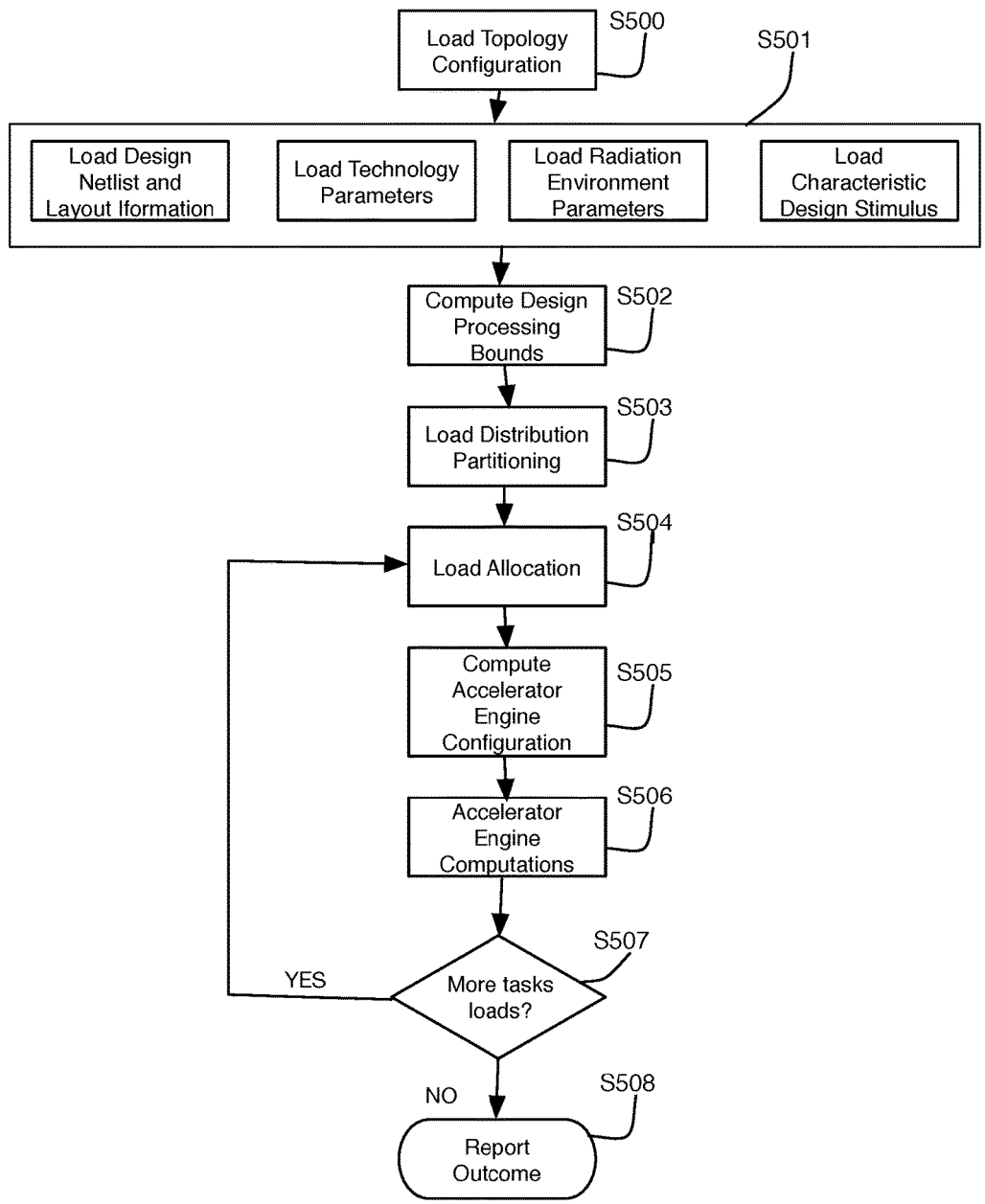
FIG. 5 is a representation of a method in accordance with embodiments.

FIG. 5 is a representation of a method in accordance with embodiments. In some embodiments, process S500 includes a hardware compute accelerator (e.g., 199 of FIG. 1) configuring the internal modules of the accelerator (e.g., 140, 150, 160, 170, 180 of FIG. 1) with the appropriate configuration parameters related to topology of the accelerator and allocating resources to be allocated for the accelerator. In some embodiments, process S501 includes: the accelerator receiving microelectronic design data and parameters including Design Netlist & layout Information, Technology Parameters, Radiation Environment Parameters and Characteristic Stimuli via the interface module circuit 140. In some embodiments, process S502 includes the control module circuit computing design processing bounds for the analysis (to be performed by an accelerator engine module circuit) based on the received microelectronic design data and parameters. In some embodiments, process S503 includes the control module circuit 150 determining load distributions and organization to be allocated to any number of Accelerator Engine Modules. In some embodiments, process S503 includes the control module circuit determining which portions of the received microelectronic design data to allocate to which accelerator engine module accessible by the control module circuit 150 (e.g., a local accelerator engine module circuit or an external accelerator module circuit). In some embodiments, process S504 includes the control module circuit sequentially allocating compute task load sets (e.g., portions of the received microelectronic design data) to each Accelerator Engine Module and in parallel across all involved Accelerator Engine Modules that are directly or indirectly communicatively coupled to the control module circuit 150. In some embodiments, process S505 includes each configuration module circuit tailoring configuration of a respective Accelerator Engine Module involved in the analysis for the assigned compute load task responsive to a communication provided by the control module circuit. In some embodiments, process S506 includes the Accelerator Engine Modules performing the prescribed computations. Each Accelerator Engine Module may exchange intermediary computation data with other Accelerator Engine Modules. In some embodiments, step S507 includes the control module circuit monitoring each Accelerator Engine Module for completion; when a computation task load is complete, the control module circuit determines whether there are more task loads allocated to the accelerator engine module, and if so, allocates the next task load in the set to the Accelerator Engine Module (YES at process S507). In some embodiments, when all the task load sets have been computed across all Accelerator Engine Modules are complete and received by the control module circuit, the control module circuit reports full analysis results to at least one of the first external system (e.g., via the secure network 120 of FIG. 1) and the user interface device (e.g., one of the user interface devices coupled to the accelerator via the port 101 of FIG. 1) via the interface control module circuit (process S508). In some embodiments, the control module circuit provides partial or initial analysis results concurrently to processing by the Accelerator Engine Modules (process S508).

4. Performing Radiation-Effects Susceptibility Analysis and Prediction—Hardware

FIG. 6 shows a flowchart of a Radiation Susceptibility Analysis and Prediction (RSAP) method in accordance with an embodiment.

A description of hardware devices that perform the method of FIG. 6 according to embodiments will now be described. In some embodiments, the method of FIG. 6 is performed by the accelerator engine module circuit 170 of FIG. 1. In some embodiments, the method of FIG. 6 is performed by the accelerator engine module circuit similar to the accelerator engine module circuit 170 of FIG. 1. In some embodiments, the the method of FIG. 6 is performed by a hardware compute accelerator, as described herein, and the hardware compute accelerator is a special purpose hardware circuit that is constructed to perform the method of FIG. 6. In some embodiments, the the method of FIG. 6 is performed by a hardware compute accelerator, as described herein, and the accelerator engine module circuit of the hardware compute accelerator is a special purpose hardware circuit that is constructed to perform the method of FIG. 6.

In some embodiments, the accelerator engine module circuit includes machine-executable program instructions executable by the accelerator engine module circuit for performing the method of FIG. 6, and the accelerator engine module circuit is constructed to execute the machine-executable instructions to perform the process of FIG. 6. In some embodiments, the accelerator engine module circuit includes processing circuitry for performing the method of FIG. 6, and the accelerator engine module circuit is constructed to perform the process of FIG. 6 responsive to the circuitry receiving data to be processed (e.g., from the control module circuit 150).

In some embodiments, the accelerator engine module circuit (e.g., 170 of FIG. 1) includes a decomposition component (601), an analytical classifier component (602), a strike model libraries component (603), a susceptibility classifier component (604), a Tile Dynamic Parameterization component (605), and a combining and refactoring component (606). In some embodiments, the strike model libraries component (603) is included in the susceptibility classifier component (604).

As shown in the embodiment of FIG. 6, the accelerator engine module circuit (e.g., 170 of FIG. 1) includes a functional topologies library 607 and a layout topologies library 608. In some embodiments, the analytical classifier component (602) includes the functional topologies library and the layout topologies library. In some embodiments, the analytical classifier component (602) includes one or more libraries in addition to or in replacement of the functional topologies library and the layout topologies library of FIG. 6.

In some implementations, the strike model libraries component (603) includes the functional topologies library and the layout topologies library. In some embodiments, the strike model libraries component (603) includes one or more libraries in addition to or in replacement of the functional topologies library and the layout topologies library of FIG. 6.

In some embodiments, the components 601-608 of FIG. 6 are hardware circuits. In some embodiments, the components 601-608 of FIG. 6 are implemented as at least one hardware device that stores machine-executable instructions that are executable by the accelerator engine module circuit to perform the corresponding steps of the method of FIG. 6. In some embodiments, the components 601-608 of FIG. 6 are implemented as at least one hardware device that stores machine-executable instructions that are executable by the accelerator engine module circuit to perform the corresponding steps of the method of FIG. 6, and that stores at least one library (e.g., a functional topologies library, a layout topologies library, and the like).

In some embodiments, the method of FIG. 6 is performed by a processing unit. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, at least one processor of the processing is one of a microcontroller, a CPU (Central Processing Unit), a GPU (Graphics Processing Unit), and the like. In some embodiments, the processing unit includes at least one of a central processing unit (processor), a GPU, and a multi-processor unit (MPU).

5. Performing Radiation-Effects Susceptibility Analysis and Prediction—Method The following is a description of how the RASP method described herein (performed by the aforementioned hardware components) when applied to a semiconductor circuit design (e.g., the first microelectronic design described herein) achieves technical objectives for developing low risk radiation susceptibility analysis and prediction capabilities.

In some embodiments, the RASP method (e.g., the method of FIG. 6) is applicable once the engineering design team has developed an initial layout from a netlist description (e.g., "the design netlist and layout information" described herein) of the semiconductor circuit design (e.g., the first microelectronic design described herein). In some embodiments, the engineering design team provides a characteristic set of expected test vector stimulus data (e.g., "the characteristic stimuli" described herein) for the semiconductor circuit design. In some embodiments, the characteristic stimuli may improve the accuracy of the computations performed by the accelerator engine module circuit. In some embodiments, the semiconductor circuit design layout and characteristic stimulus data along with the semiconductor circuit design process technology node information (e.g., "the technology parameters" described herein) satisfy the functional, design topology and design physical properties requirements for determining radiation-susceptibility analysis. The addition of the designated radiation environment (e.g., "the radiation environment parameters" described herein) under which the semiconductor circuit design is expected to operate satisfies the remaining radiation effects and device physics aspects of the requirement.

The RSAP method begins with a Decomposition Process component 601 separating a placed and routed instance of a candidate semiconductor circuit design into constituent smaller pieces called tiles (process S601). In addition, the Decomposition Process component 601, through functional simulation analysis determines the expected set of possible input and output data stimuli at the tile interfaces (process S601).

Each tile is subsequently processed by an Analytical Classifier component 602 that matches the tile topology, function and layout against that of pre-existing tile model entries in the Analytical Classifier tile model libraries (process S602). In some embodiments, the analytical classifier tile module libraries are included in the Analytical Classifier component 602. In some embodiments, the analytical classifier tile module libraries are included in the strike model libraries component (603). In some embodiments, the Analytical Classifier tile model libraries are the Functional Topologies Library 607 and the Layout Topologies Library 608 of FIG. 6.

At the process S604, if a suitable match is found ("NO" at process S603) in the Analytical Classifier tile model libraries (e.g., 607, 608) ("NO" at process S603), the related Susceptibility Abstraction Model entry from the Strike Model Library 603 for the given design radiation environment is selected. In some embodiments, the selected Susceptibility Abstraction Model for the tile is a charge-deposition susceptibility abstraction for the tile.

At the process S604, the Tile Dynamic Parameterization Process component 605 applies the set of expected stimuli determined for the tile by the Decomposition Process component 601 as well as engineering team defined design operating parameters (e.g., provided by at least one of a first external system, e.g., via the secure network 120 of FIG. 1, and a user interface device, e.g., one of the user interface devices coupled to the accelerator via the port 101 of FIG. 1, as described herein) and optionally provided stimuli (e.g., provided by at least one of a first external system, e.g., via the secure network 120 of FIG. 1, and a user interface device, e.g., one of the user interface devices coupled to the accelerator via the port 101 of FIG. 1, as described herein) to computations on the selected Susceptibility Abstraction Model. The outcome of these computations (e.g., the results generated by the process S604) is the expected radiation-susceptibility metrics for that instance of the tile as utilized in the design. At the process S605, the radiation-susceptibility metrics for all the design tiles are progressively combined and re-factored on a title-to-tile area proximity basis using probability calculations in order to yield first regional then overall radiation-susceptibility metrics of the design. In some embodiments, the combining and refactoring component (606) performs the process S605. Regional and semiconductor circuit design wide Soft Error Rates (SER) and Failure In Time (FIT) figures are derived from these design radiation-susceptibility metrics using a Bayesian model and analysis.

At the process S606, when the Analytical Classifier component 602 discovers a tile for which there is no match with acceptable fit metrics in the Analytical Classifier Libraries ("YES" at process S603), the tile is labeled with a "learn" flag that indicates to all classifiers (e.g., 609, 610, and 611 of FIG. 6) that the tile must be processed for addition to the respective classifier libraries (e.g., 607, 608 of FIG. 6). The Analytical Classifier libraries are directly augmented with new entries for the functional, topological and layout information extracted by the Decomposition Process S601. The Susceptibility Abstraction Model for a missing tile is a composite model; the learning of this model therefore involves a composite Susceptibility Classifier. This composite model is produced by combining two sub-models each generated by a different sub-classifier and coupled together by a third sub-classifier. The first sub-model is a Layout-aware representation of the tile in an analog electronic circuit simulator format such as SPICE (Simulation Program with Integrated Circuit Emphasis) that is generated by the Layout Susceptibility sub-Classifier 609. This Layout-aware representation of the tile contains additional nodes that represent the potential for charge deposition and charge sharing and is stored in the Layout Susceptibility Library 612. The second sub-model is a Radiation-physics abstraction model of the tile which is generated by the Radiation-Physics Susceptibility sub-Classifier 610 and stored in the Radiation-Physics Model Library 611. This sub-classifier 610 applies a weighted two-dimensional abstraction of a TCAD (Technology Computer Aided Design) generated energy deposition from a particle strike in a volume representation of the tile layout. This process is repeated for emulated omni-directional particle strikes as dictated by the flux and fluence of the designated radiation environment in order to produce a Radiation-Physics Model Set for the tile.

Figure 9:
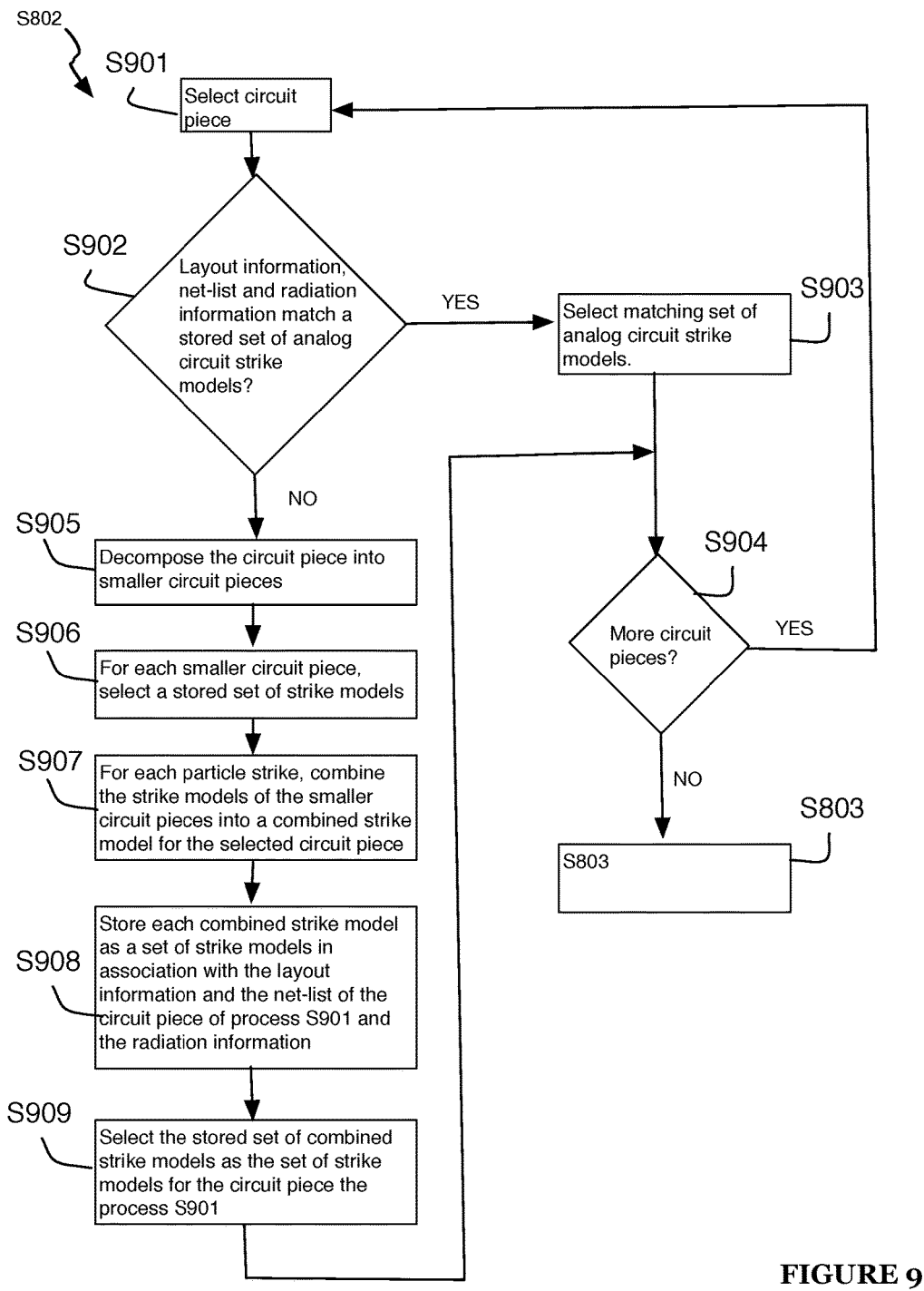
FIG. 9 is a representation of a method in accordance with embodiments.

In some embodiments, the process S606 includes performing processes similar to the processes S905, S906, S907, and S908 of FIG. 9.

Finally the Dynamic Applied Strike Susceptibility sub-Classifier 611 couples the tile entry model from the Layout Susceptibility Library 612 with that of Radiation-Physics Model Set 613 by applying the derived appropriate weighted charge values and parameters to the applicable nodes. The outcome of this layout aware weighted charge-deposition representation is stored in the Strike Model Library 603 and is the Susceptibility Abstraction Model for the tile under a specific radiation environment. A subset of tiles will be fabricated and subjected to radiation testing in order to back-annotate and improve the effectiveness of the Susceptibility Abstraction Models.

The process of the method of FIG. 6 as described herein continually augments the classifier libraries (e.g., 607, 608) as more tiles in different radiation environments are learned. During spare compute cycles in anticipation of future use, the accelerator platform (e.g., the accelerator engine module circuit described herein) further augments the Radiation-Physics Model Library 613 and subsequently the Strike Model Library 603 with model sets of new tiles for other supported radiation environments. The more tiles are learned by the process, the faster subsequent semiconductor circuit designs are processed, as does the ability to address increasingly large and highly heterogeneous semiconductor circuit designs.

6. Systems

Figure 7A:
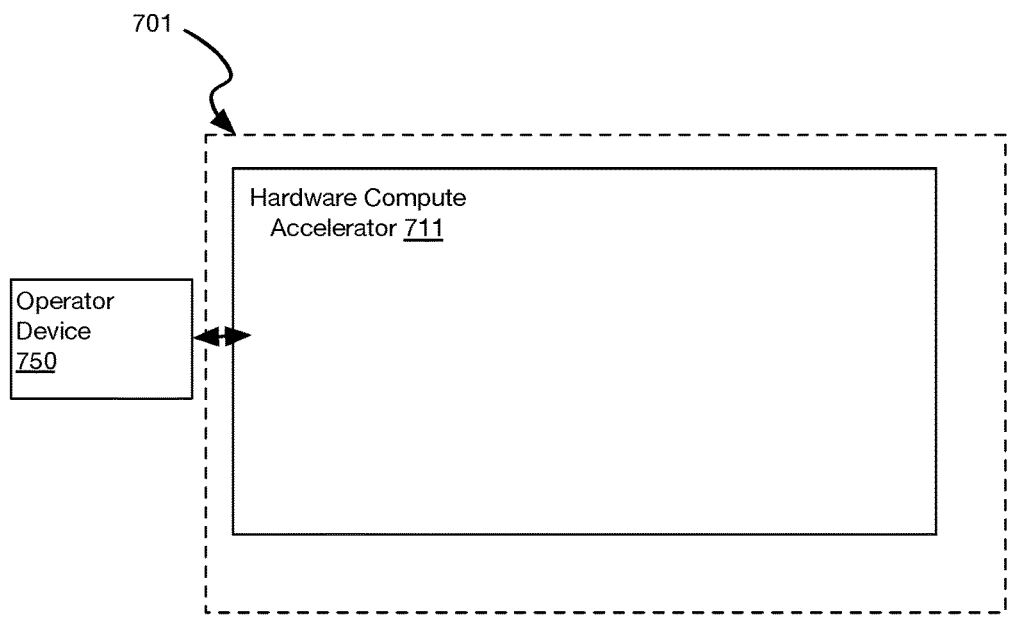
FIGS. 7A-D are schematic diagrams of semiconductor design evaluation hardware systems in accordance with embodiments.
Figure 7B:
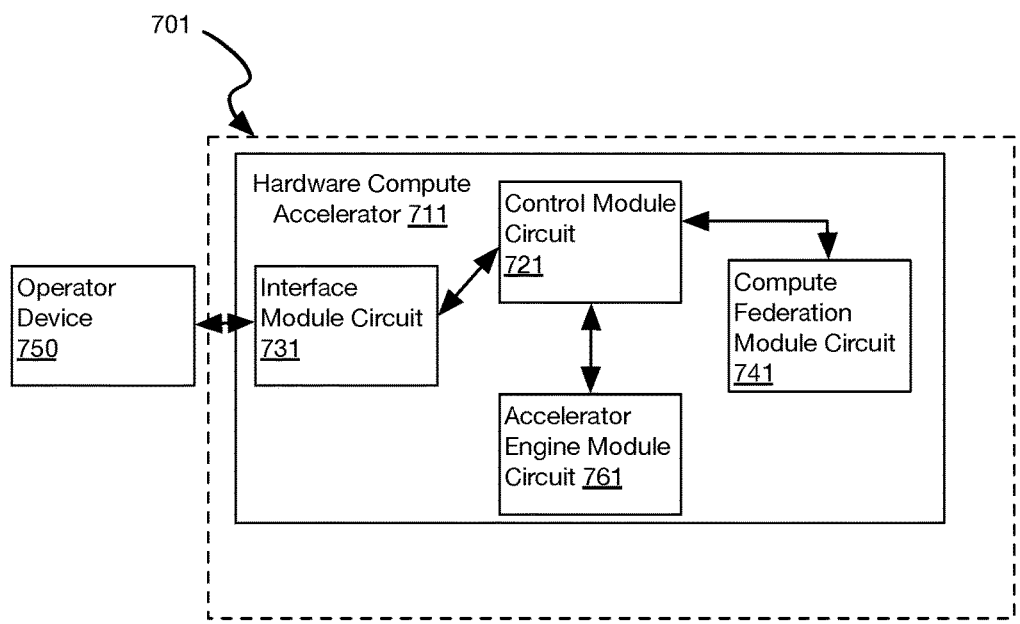

FIG. 7A is a schematic diagram of a semiconductor design evaluation hardware system 701 having a single hardware compute accelerator 711 according to embodiments. In some embodiments, the hardware compute accelerator 711 of FIG. 7A includes an interface module circuit 731, a control module circuit 721, a compute federation module circuit 741, and an accelerator engine module circuit 761, as shown in FIG. 7B. In some embodiments, the semiconductor design evaluation hardware system 701 is communicatively coupled to an operator device 750.

In some embodiments, the interface module circuit 731 is similar to the interface module circuit 140 of FIG. 1. In some embodiments, the control module circuit 721 is similar to the control module circuit 150 of FIG. 1. In some embodiments, the accelerator engine module circuit 761 is similar to the accelerator engine module circuit 170 of FIG. 1. In some embodiments, the compute federation module circuit 741 is similar to the compute federation module circuit 180 of FIG. 1.

In some embodiments, the hardware compute accelerator 711 is similar to the compute node 199 of FIG. 1.

Figure 7C:
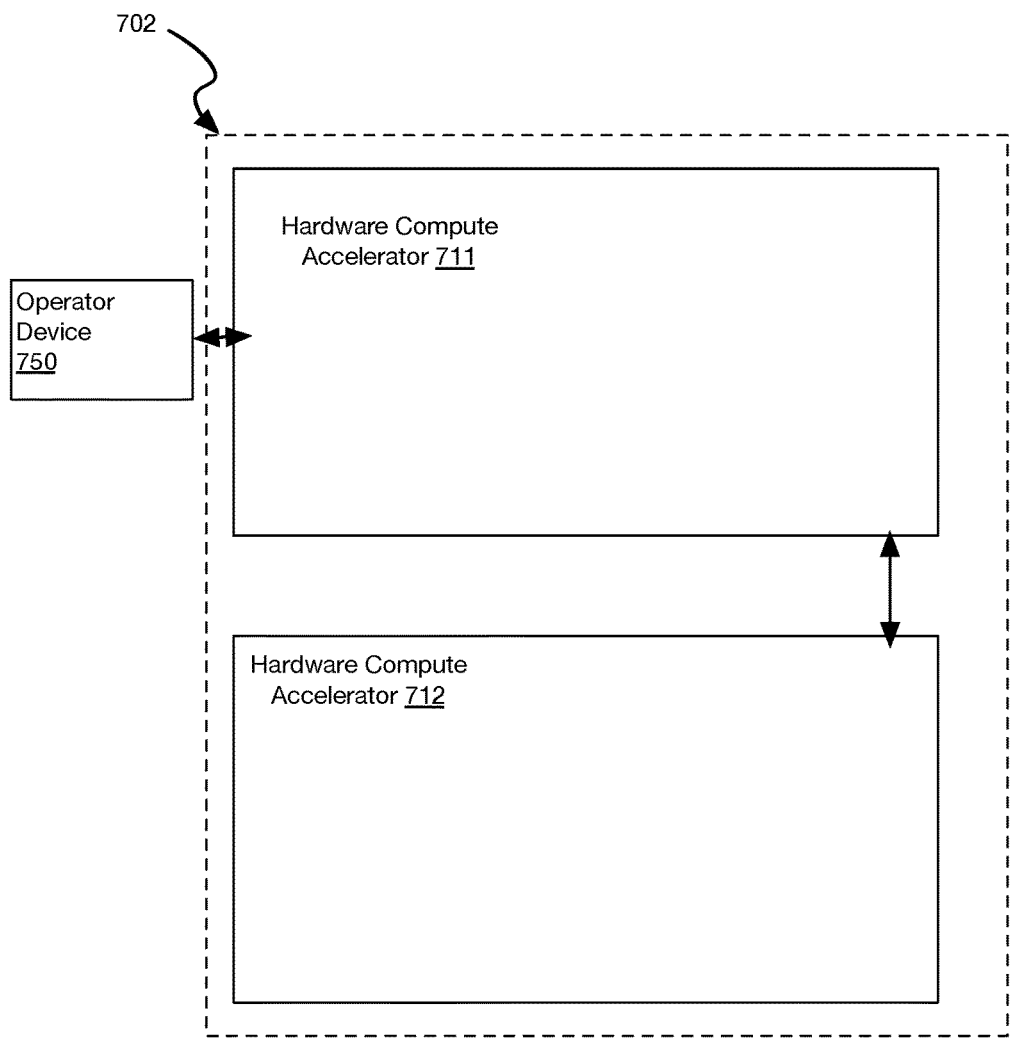
Figure 7D:
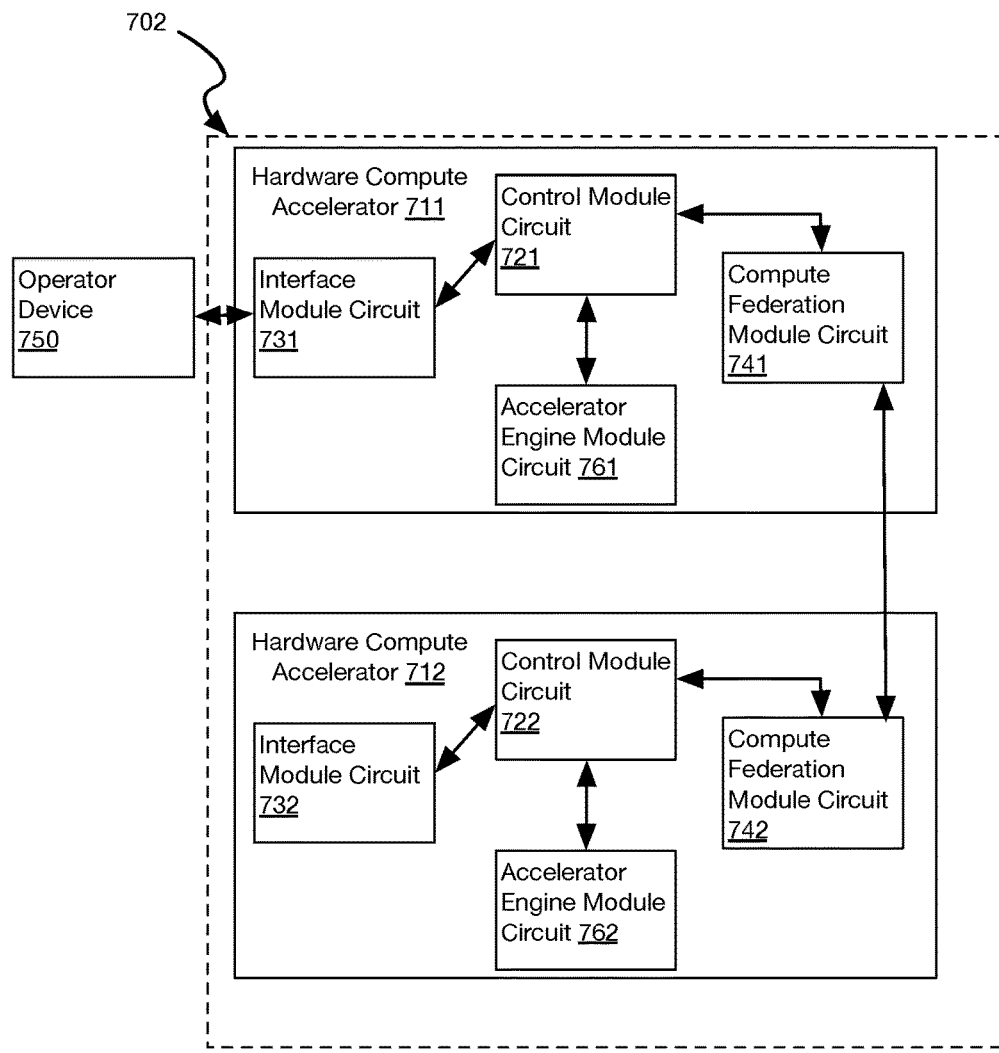

FIG. 7C is a schematic diagram of a semiconductor design evaluation hardware system 702 having a plurality of hardware compute accelerators 711 and 712 according to embodiments. In some embodiments, the hardware compute accelerator 711 of FIG. 7C includes an interface module circuit 731, a control module circuit 721, a compute federation module circuit 741, and an accelerator engine module circuit 762, as shown in FIG. 7D. In some embodiments, the hardware compute accelerator 712 if FIG. 7C includes an interface module circuit 732, a control module circuit 722, a compute federation module circuit 742, and an accelerator engine module circuit 762, as shown in FIG. 7D. In some embodiments, the hardware compute accelerator system 702 is communicatively coupled to an operator device 750.

In some embodiments, the interface module circuit 732 is similar to the interface module circuit 140 of FIG. 1. In some embodiments, the control module circuit 722 is similar to the control module circuit 150 of FIG. 1. In some embodiments, the accelerator engine module circuit 762 is similar to the accelerator engine module circuit 170 of FIG. 1. In some embodiments, the compute federation module circuit 742 is similar to the compute federation module circuit 180 of FIG. 1.

In some embodiments, the hardware compute accelerator 712 is similar to the compute node 199 of FIG. 1.

7. Methods

Figure 8A:
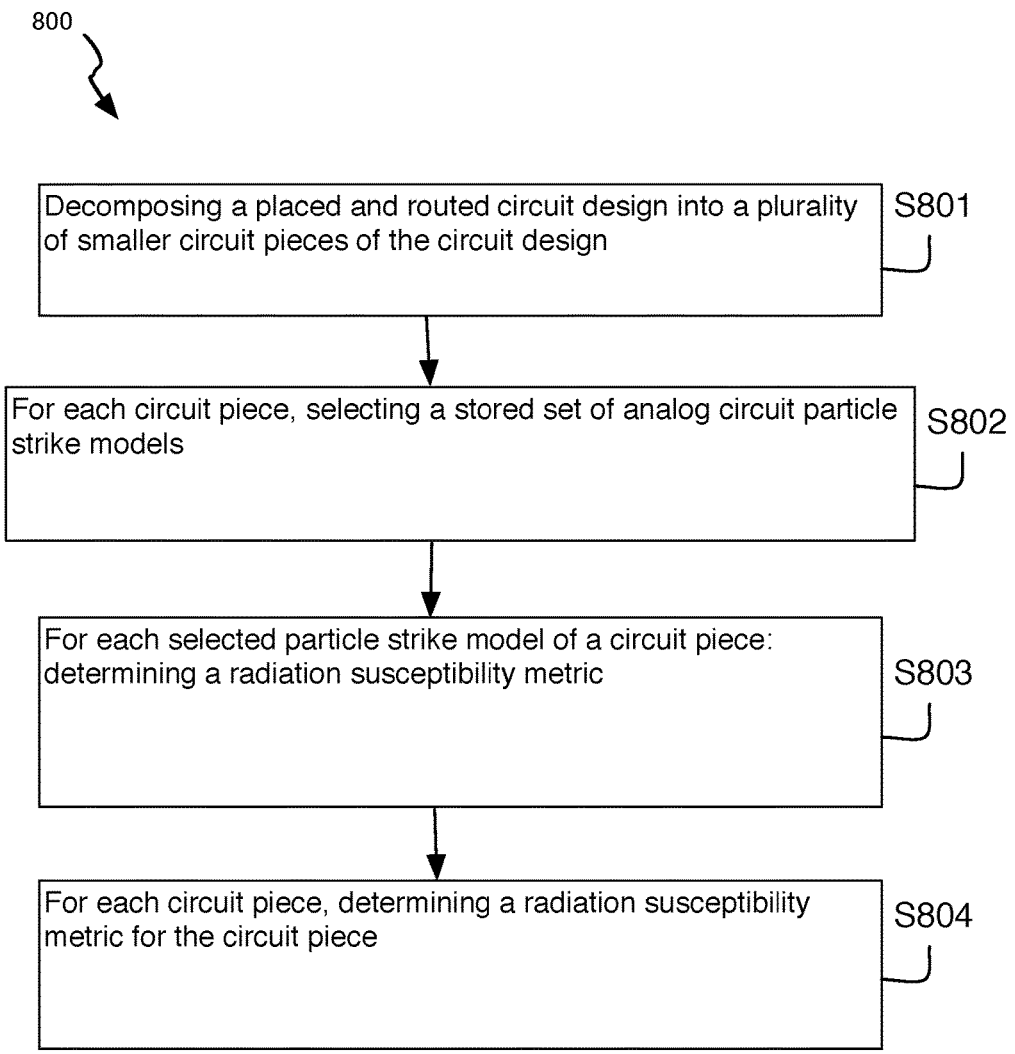
FIGS. 8A-D are representations of methods in accordance with embodiments.

FIGS. 8A-8D are representations of methods, according to embodiments. In some embodiments, the method of 800 FIG. 8A is performed by a semiconductor design evaluation hardware system. In some embodiments, the semiconductor design evaluation hardware system is a hardware server. In some embodiments, the semiconductor design evaluation hardware system is a compute node similar to the compute node 199 of FIG. 1. In some embodiments, the semiconductor design evaluation hardware system is a hardware server cluster that includes a plurality of hardware servers. In some embodiments, the semiconductor design evaluation hardware system is a high performance computing system. In some embodiments, the semiconductor design evaluation hardware system is similar to at least one of the systems 701 and 702 of FIGS. 7A-7D. In some embodiments, the semiconductor design evaluation hardware system includes a single hardware compute accelerator (e.g., system 701 of FIGS. 7A-B). In some embodiments, the semiconductor design evaluation hardware system includes a plurality of hardware compute accelerators (e.g., system 702 of FIGS. 7C-D). In some embodiments, each hardware compute accelerator is similar to the compute node 199 of FIG. 1.

In some embodiments, the method 800 of FIG. 8A includes: decomposing a placed and routed circuit design of first IC (integrated circuit) layout information into a plurality of smaller circuit pieces of the circuit design, each circuit piece having placed and routed IC layout information and a gate-level netlist (process S801); for each circuit piece, selecting a stored set of analog circuit particle strike models based on the layout information and the gate-level net-list of the circuit piece and radiation environment information received for the first IC layout information, wherein each particle strike model has charge voltage circuit components with radiation susceptibility charge voltage values corresponding to a respective particle strike of a radiation environment identified by the received radiation environment information, and wherein each particle strike model corresponds to a different particle strike of the radiation environment (process S802); for each selected particle strike model of a circuit piece: determining a radiation susceptibility metric by comparing functional results generated by functional simulation of the of the particle strike model with functional results generated by functional simulation of the circuit piece (process S803); for each circuit piece, determining a radiation susceptibility metric for the circuit piece based on the radiation susceptibility metrics generated for each selected particle strike model of the circuit piece (process S804).

In some embodiments, selecting the stored set of analog circuit particle strike models includes accessing the stored set of analog circuit particle strike models from a storage device (e.g., 1005 of FIG. 10).

In some embodiments, each circuit piece is a tile as described herein with respect to FIG. 6.

Figure 8B:
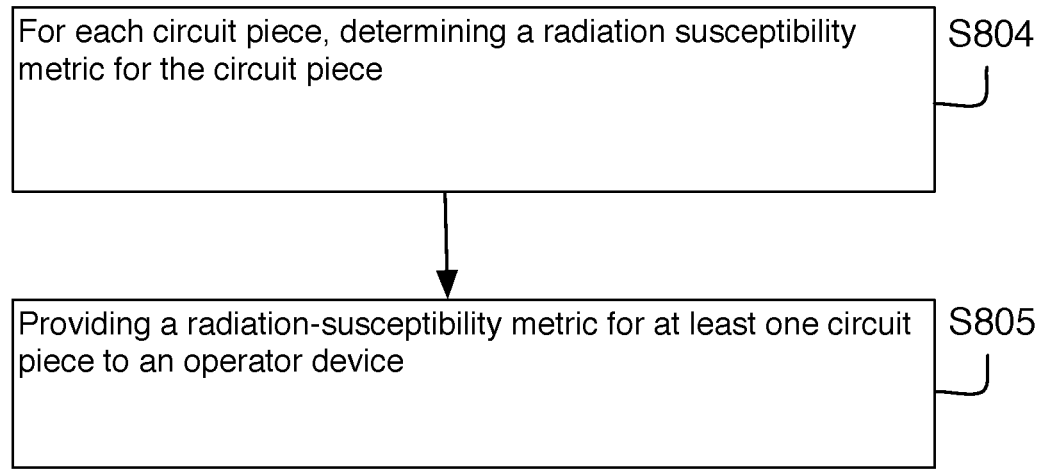

In some embodiments, the method includes: providing the radiation-susceptibility metric for at least one circuit piece to an operator device (process S805 of FIG. 8B). In some embodiments, the method includes: providing the radiation-susceptibility metric for each circuit piece to an operator device (process S805 of FIG. 8B). By virtue of providing a radiation-susceptibility metric for a circuit piece to an operator device, an operator of the device can identify radiation-susceptibility of a circuit piece of the first semiconductor circuit and update a design of the circuit piece to address the determined radiation-susceptibility.

Figure 8C:
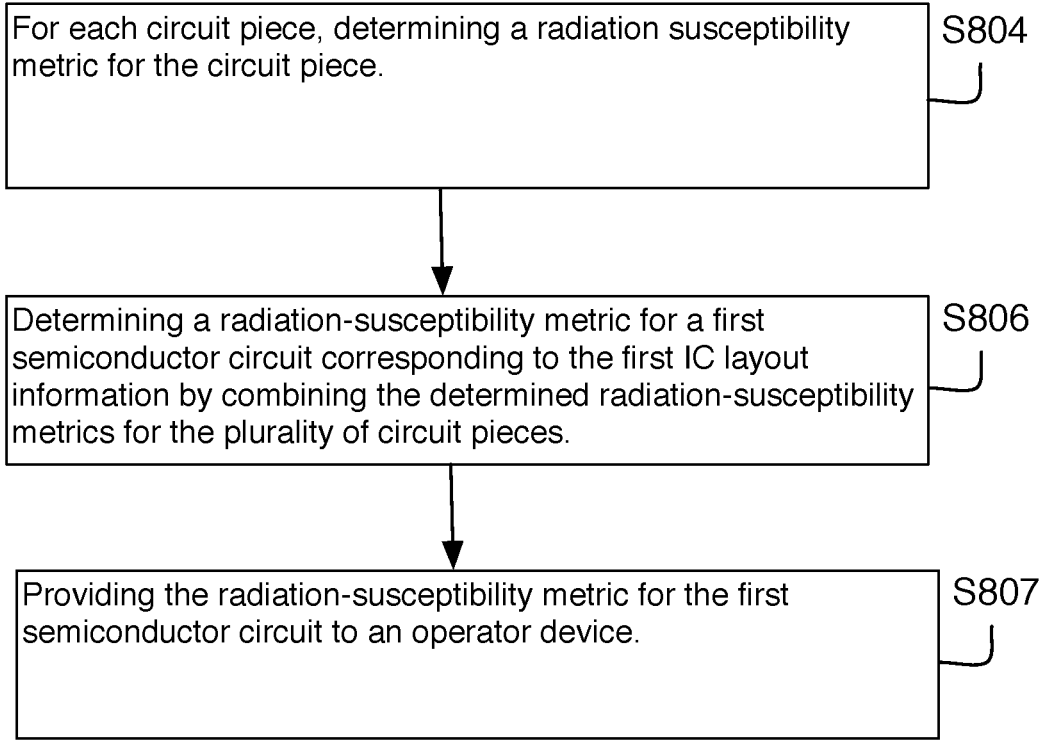

In some embodiments, the method includes: determining a radiation-susceptibility metric for a first semiconductor circuit corresponding to the first IC layout information by combining the determined radiation-susceptibility metrics for the plurality of circuit pieces (process S806 of FIG. 8C). In some embodiments, the method 800 further includes: providing the radiation-susceptibility metric for the first semiconductor circuit to an operator device (e.g., 750) (process S807 of FIG. 8C).

Figure 8D:
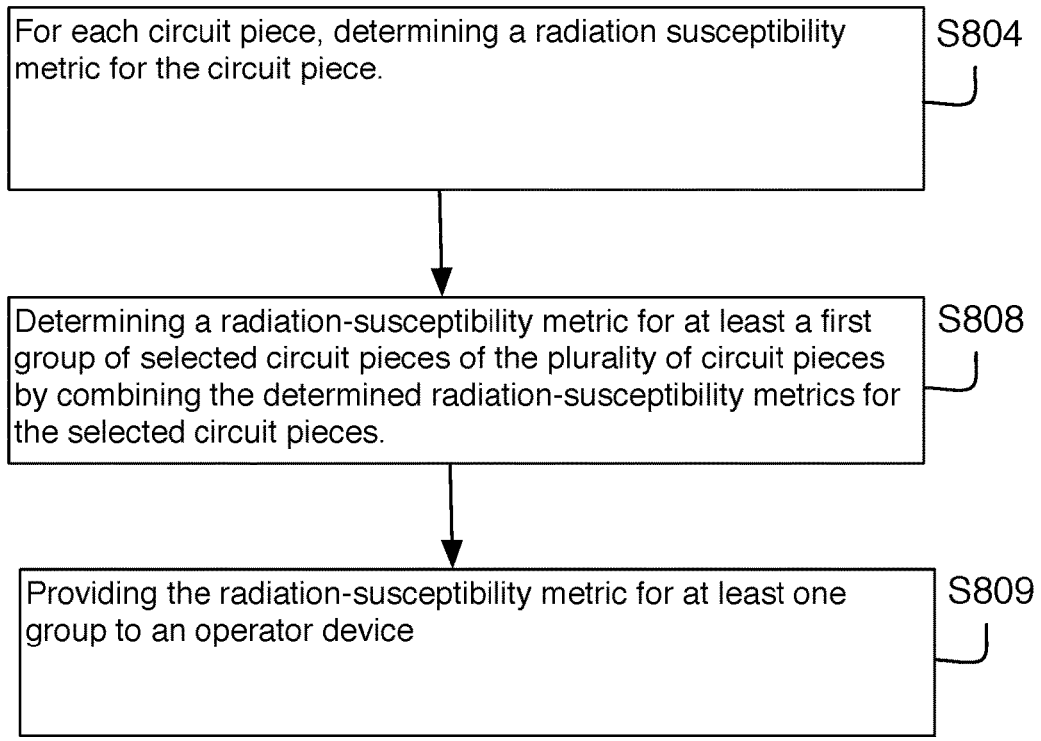

In some embodiments, the method includes: determining a radiation-susceptibility metric for at least a first group of selected circuit pieces of the plurality of circuit pieces by combining the determined radiation-susceptibility metrics for the selected circuit pieces (process S808 of FIG. 8D). In some embodiments, the method includes: determining a radiation-susceptibility metric for a plurality of groups of selected circuit pieces of the plurality of circuit pieces. In some embodiments, for each group of selected circuit pieces, a radiation-susceptibility metric is determined by combining the determined radiation-susceptibility metrics for the selected circuit pieces. In some embodiments, the method includes: providing the radiation-susceptibility metric for at least one group to an operator device (process S809 of FIG. 8D). By virtue of providing the radiation-susceptibility metric for a group of selected circuit pieces to the operator device, an operator of the device can identify radiation-susceptibility of a sub-circuit of the first semiconductor circuit identified by the group of selected circuit pieces, and update a design of the group of circuit pieces to address the determined radiation-susceptibility.

In some embodiments, selecting the selected circuit pieces comprises: selecting the circuit pieces based on functional topology indicated by the first IC layout information. In some embodiments, a human-readable description of a function of the first group of selected circuit pieces is generated, and providing the radiation-susceptibility metric for the first group to the operator device includes: providing the human-readable description of the first group of selected circuit pieces to the operator device. In some embodiments, the human-readable description describes a functional component of the first semiconductor design. By virtue of providing the human-readable description of the first group of selected circuit pieces to the operator device, an operator of the device can identify radiation susceptibility of a particular functional component of the first semiconductor design, and update a design of the functional component to address the determined radiation-susceptibility.

In some embodiments, the determined radiation-susceptibility metrics for the plurality of circuit pieces are combined based on proximity of the circuit pieces within an area of the placed and routed design of first IC layout information.

In some embodiments, the determined radiation-susceptibility metrics for the plurality of circuit pieces are combined based on proximity of the circuit pieces as indicated by layout topology indicated by the first IC layout information.

In some embodiments, the method 800 further includes: receiving the first IC (integrated circuit) layout information from the operator device.

In some embodiments, method of 800 is performed by a semiconductor design evaluation hardware system, and the operator device is external to the semiconductor design evaluation hardware system.

In some embodiments, a number of circuit components of each circuit piece is smaller than a number of circuit components of the placed and routed circuit design of the first IC layout information.

In some embodiments, the placed and routed circuit design of the first semiconductor circuit is a fully placed and routed circuit design. In some embodiments, the placed and routed circuit design of the first semiconductor circuit is a partially placed and routed circuit design.

8. Accelerator Engine

In some embodiments, the semiconductor design evaluation hardware system (e.g., 701, 702) includes a plurality of accelerator engine module circuits (e.g., 761, 762). In some embodiments, the process S801 is performed by at least one of the plurality of accelerator engine module circuits (e.g., 761, 762) of the semiconductor design evaluation hardware system. In some embodiments, the process S802 is performed by at least one of the plurality of accelerator engine module circuits (e.g., 761, 762) of the semiconductor design evaluation hardware system. In some embodiments, the process S803 is performed by at least one of the plurality of accelerator engine module circuits (e.g., 761, 762) of the semiconductor design evaluation hardware system. In some embodiments, the process S804 is performed by at least one of the plurality of accelerator engine module circuits (e.g., 761, 762) of the semiconductor design evaluation hardware system. In some embodiments, the process S805 is performed by at least one of the plurality of accelerator engine module circuits (e.g., 761, 762) of the semiconductor design evaluation hardware system.

In some embodiments, the process S806 is performed by at least one of the plurality of accelerator engine module circuits (e.g., 761, 762) of the semiconductor design evaluation hardware system.

In some embodiments, the process S807 is performed by at least one of the plurality of accelerator engine module circuits (e.g., 761, 762) of the semiconductor design evaluation hardware system.

In some embodiments, the process S808 is performed by at least one of the plurality of accelerator engine module circuits (e.g., 761, 762) of the semiconductor design evaluation hardware system.

In some embodiments, the process S809 is performed by at least one of the plurality of accelerator engine module circuits (e.g., 761, 762) of the semiconductor design evaluation hardware system.

9. IC Layout Information

In some embodiments, the semiconductor design evaluation hardware system receives the first IC (integrated circuit) layout information via a first interface module circuit of the semiconductor design evaluation hardware system. In some embodiments, the first IC layout information is layout information for a placed and routed design of a first semiconductor circuit.

In some embodiments, the first IC layout information is layout information for a fully placed and routed design of a first semiconductor circuit.

In some embodiments, the first IC layout information is layout information for a partially placed and routed design of a first semiconductor circuit.

In some embodiments, the first layout information includes semiconductor circuit design process technology node information.

10. Gate-Level Netlist

In some embodiments, the semiconductor design evaluation hardware system (e.g., 701, 702) receives a first gate-level netlist via a first interface module circuit (e.g., 731) of the semiconductor design evaluation hardware system, and the first gate-level netlist is a netlist of the first semiconductor circuit. In some embodiments, the semiconductor design evaluation hardware system extracts a first gate-level netlist from the first IC layout information, and the first gate-level netlist is a netlist of the first semiconductor circuit. In some embodiments, the semiconductor design evaluation hardware system extracts a first gate-level netlist from the first IC layout information by using an electronic design automation (EDA) tool, and the first gate-level netlist is a netlist of the first semiconductor circuit.

11. First Stimuli Data

In some embodiments, the semiconductor design evaluation hardware system (e.g., 701, 702) receives first stimuli data for the first semiconductor circuit via the first interface module circuit (e.g., 731) of the semiconductor design evaluation hardware system.

12. Radiation Environment Information

In some embodiments, the semiconductor design evaluation hardware system (e.g., 701, 702) receives the radiation environment information via the first interface module circuit (e.g., 731) of the semiconductor design evaluation hardware system.

13. Decomposing a Placed and Routed Design (Process S801)

In some embodiments, decomposing a placed and routed circuit design of first IC layout information into a plurality of IC circuit pieces, includes: selecting a plurality of groups of circuit components from a plurality of circuit components of the first IC layout information, extracting layout information for each group from the first IC layout information, wherein the layout information for each group of circuit components specifies the circuit components of the first IC layout information that are selected for the group and circuit connections between the circuit components of the group, wherein the placement and routing of components of each circuit piece (as specified by the corresponding layout information) is the same as placement and routing of the circuit components in the circuit design of the first IC design layout information.

In some embodiments, an EDA tool is used to decompose a placed and routed circuit design of first IC layout information into a plurality of IC circuit pieces.

In some embodiments, decomposing a placed and routed circuit design of first IC layout information into a plurality of IC circuit pieces, includes: for each circuit piece, extracting a gate-level netlist for the circuit piece from the layout information of the circuit piece. In some embodiments, for each circuit piece, an EDA tool is used to extract the gate-level netlist for the circuit piece from the layout information for the circuit piece.

In some embodiments, decomposing a placed and routed circuit design of first IC layout information into a plurality of IC circuit pieces, includes: for each circuit piece, extracting a gate-level netlist for the circuit piece from the first IC layout information. In some embodiments, for each circuit piece, an EDA tool is used to extract the gate-level netlist for the circuit piece from the first IC layout information.

In some embodiments, each circuit component of the placed and routed circuit design of the first IC layout information is included in only one circuit piece of the plurality of circuit pieces. In some embodiments, a combination of the plurality of circuit pieces represent the placed and routed circuit design of the first IC layout information.

14. Selecting Strike Models (Process S802)

In some embodiments, selecting a stored set of analog circuit strike models for each circuit piece based on the layout information and the gate-level net-list of the circuit piece and radiation environment information received for the first IC layout information includes: for each circuit piece, selecting a set of analog circuit strike models stored in association with layout information, a gate-level netlist, and radiation environment information that matches the layout information and the gate-level net-list of the circuit piece and the radiation environment information received for the first IC layout information.

15. Matching Layouts (Process S802)

In some embodiments, selecting a set of analog circuit strike models stored in association with layout information, a gate-level netlist, and radiation environment information that matches the layout information and the gate-level net-list of the circuit piece and the radiation environment information received for the first IC layout information includes: determining a match between the layout information of the circuit piece and layout information associated with a set of analog circuit strike models. In some embodiments, an EDA tool is used to determine a match between the layout information of the circuit piece and layout information associated with a set of analog circuit strike models.

In some embodiments, a process for determining a match between the layout information of the circuit piece and layout information associated with a set of analog circuit strike models is updated. In some embodiments, a process for determining a match between the layout information of the circuit piece and layout information associated with a set of analog circuit strike models is updated, such that a radiation-susceptibility metric for the first semiconductor circuit generated by using an original matching process is different from a radiation-susceptibility metric for the first semiconductor circuit generated by using an updated matching process.

In some embodiments, determining a match between the layout information of the circuit piece and layout information associated with a set of analog circuit strike models includes: matching circuit geometry of the layout information of the circuit piece and circuit geometry of the layout information associated with the set of analog circuit strike models.

In some embodiments, determining a match between the layout information of the circuit piece and layout information associated with a set of analog circuit strike models includes: matching technology properties of circuit components of the layout information of the circuit piece and technology properties of circuit components of the layout information associated with the set of analog circuit strike models.

In some embodiments, determining a match between the layout information of the circuit piece and layout information associated with a set of analog circuit strike models includes: matching material properties of circuit components of the layout information of the circuit piece and material properties of circuit components of the layout information associated with the set of analog circuit strike models.

In some embodiments, determining a match between the layout information of the circuit piece and layout information associated with a set of analog circuit strike models includes: matching circuit layout of the layout information of the circuit piece and circuit layout of the layout information associated with the set of analog circuit strike models.

In some embodiments, determining a match between the layout information of the circuit piece and layout information associated with a set of analog circuit strike models includes: matching circuit layout topology of the layout information of the circuit piece and circuit layout topology of the layout information associated with the set of analog circuit strike models.

In some embodiments, determining a match between layout information of the circuit piece and layout information associated with a set of analog circuit strike models includes: matching circuit functionality of the layout information of the circuit piece and circuit functionality of the layout information associated with the set of analog circuit strike models.

In some embodiments, a semiconductor design functional simulator is used to simulate the circuit functionality of the layout information of the circuit piece and the circuit functionality of the layout information associated with the set of analog circuit strike models.

In some embodiments, the semiconductor design functional simulator uses the first stimuli data to simulate the circuit functionality of the layout information of the circuit piece and the circuit functionality of the layout information associated with the set of analog circuit strike models. In some embodiments, the semiconductor design evaluation hardware system uses the semiconductor design functional simulator to determine stimuli data for the circuit piece at each input interface of the circuit piece by simulating functionality of the first IC layout information with the first stimuli data; and the semiconductor design functional simulator uses the determined stimuli data for the circuit piece to simulate the circuit functionality of the layout information of the circuit piece and the circuit functionality of the layout information associated with the set of analog circuit strike models In some embodiments, a gate-level netlist of corresponding to the layout information of the circuit piece is accessed, and a gate-level netlist of corresponding to the layout information associated with the set of analog circuit strike models is accessed; a gate-level circuit functional simulator is used to simulate the functionality of the circuit piece (by using the circuit piece gate-level netlist) and the functionality of the set of analog circuit strike models (by using the gate-level netlist of the set of analog circuit strike models).

In some embodiments, the gate-level circuit simulator uses the first stimuli data to simulate the functionality of the circuit piece (by using the circuit piece gate-level netlist) and the functionality of the set of analog circuit strike models (by using the gate-level netlist of the set of analog circuit strike models).

In some embodiments, the semiconductor design evaluation hardware system uses the gate-level circuit functional simulator to determine stimuli data for the circuit piece at each input interface of the circuit piece by simulating functionality of the first gate-level netlist with the first stimuli data; and the gate-level circuit simulator uses the determined stimuli data for the circuit piece to simulate the functionality of the circuit piece (by using the circuit piece gate-level netlist) and the functionality of the set of analog circuit strike models (by using the gate-level netlist of the set of analog circuit strike models).

16. Matching Netlists (Process S802)

In some embodiments, selecting a set of analog circuit strike models stored in association with layout information, a gate-level netlist, and radiation environment information that matches the layout information and the gate-level net-list of the circuit piece and the radiation environment information received for the first IC layout information includes: determining a match between a gate-level netlist of the circuit piece and a gate-level netlist associated with a set of analog circuit strike models. In some embodiments, an EDA tool is used to determine a match between a gate-level netlist of the circuit piece and a gate-level netlist associated with a set of analog circuit strike models.

In some embodiments, determining a match between a gate-level netlist of the circuit piece and a gate-level netlist associated with a set of analog circuit strike models includes: matching circuit components of the gate-level netlist of the circuit piece and circuit components of the gate-level netlist associated with the set of analog circuit strike models.

In some embodiments, determining a match between a gate-level netlist of the circuit piece and a gate-level netlist associated with a set of analog circuit strike models includes: matching properties of circuit components of the gate-level netlist of the circuit piece and properties of circuit components of the gate-level netlist associated with the set of analog circuit strike models.

In some embodiments, determining a match between a gate-level netlist of the circuit piece and a gate-level netlist associated with a set of analog circuit strike models includes: matching circuit connections of circuit components of the gate-level netlist of the circuit piece and circuit connections of circuit components of the gate-level netlist associated with the set of analog circuit strike models.

In some embodiments, determining a match between a gate-level netlist of the circuit piece and a gate-level netlist associated with a set of analog circuit strike models includes: matching circuit functional topology of a circuit of the gate-level netlist of the circuit piece and circuit functional topology of a circuit of the gate-level netlist associated with the set of analog circuit strike models.

In some embodiments, determining a match between a gate-level netlist of the circuit piece and a gate-level netlist associated with a set of analog circuit strike models includes: matching circuit functionality of a circuit of the gate-level netlist of the circuit piece and functionality of a circuit of the gate-level netlist associated with the set of analog circuit strike models.

In some embodiments, a gate-level circuit functional simulator is used to simulate the functionality of the circuit of the gate-level netlist of the circuit piece and the functionality of the circuit of the gate-level netlist associated with the set of analog circuit strike models.

17. Process S802

In some embodiments, the process S802 includes processes S901-S909 as shown in FIG. 9. At process S901, a circuit piece is selected. At process S902, a determination is made as to whether the layout information and the gate-level net-list of the circuit piece and the radiation environment information received for the first IC layout information match layout information, a gate-level netlist, and radiation environment information of a stored set of analog circuit strike models. If there is not a match, ("NO" at process S902), then processing proceeds to process S905 (described below). If is a match, ("YES" at process S902), then processing proceeds to process S903. At process S903, the matching set of analog circuit strike models is selected as the set of analog circuit strike models for the selected circuit piece, and processing proceeds to process S904.

At process S904, a determination is made as to whether there are additional circuit pieces to be matched. If there are no more circuit pieces to be matched ("NO" at process S904), processing proceeds to process S803 (of FIG. 8A). If there are more circuit pieces to be matched ("YES" at process S904), processing returns to process S901.

18. Combining Strike Models for Smaller Circuit Pieces if No Match for the Original Circuit Piece (Process S802)

In some embodiments, selecting a stored set of analog circuit strike models for each circuit piece based on the layout information and the gate-level net-list of the circuit piece and radiation environment information received for the first IC layout information includes: in a case where the layout information and the gate-level net-list of a circuit piece and the radiation environment information received for the first IC layout information do not match a stored set of analog circuit strike models ("NO" at process S902 of FIG. 9): decomposing the circuit piece into a plurality of smaller sub-circuit pieces, each smaller sub-circuit piece having placed and routed IC layout information and a gate-level netlist (process S905 of FIG. 9); for each smaller sub-circuit piece, selecting a stored set of analog circuit strike models based on the layout information and the gate-level net-list of the smaller sub-circuit piece and the received radiation environment information (as described herein for circuit pieces with respect to process S802), wherein each strike model of the selected set corresponds to a different particle strike (process S906 of FIG. 9); for each particle strike, combining the strike models of the smaller sub-circuit pieces into a combined strike model for the circuit piece (S907 of FIG. 9); storing each combined strike model as a set of strike models in association with the layout information and the gate-level net-list of the circuit piece and the radiation environment information received for the first IC layout information (process S908 of FIG. 9); and selecting the stored set of combined strike models as the set of analog circuit strike models for the circuit piece (process S909 of FIG. 9).

In some embodiments, an EDA tool is used to combine the strike models of the smaller sub-circuit pieces into a combined strike model for the circuit piece.

In some embodiments, combining the strike models of the smaller sub-circuit pieces into a combined strike model for the circuit piece includes: generating the combined strike model to include the circuits of the strike models of the smaller sub-circuit pieces, and include connections between circuits of the strike models of the smaller sub-circuit pieces in accordance with the circuit connections of the corresponding circuit piece, such that the combined strike model represents the circuit of the circuit piece.

In some embodiments, there are a plurality of combined strike model circuit interconnection sets, each circuit interconnection set including a different set of connections between circuits of the strike models of the smaller sub-circuits, and the combined strike model is generated by selecting a circuit interconnection set and combining the strike models of the smaller sub-circuit pieces in accordance with the selected circuit interconnection set. In some embodiments, a machine-learning process is used to select the selected circuit interconnection set.

In some embodiments, there are a plurality of processes for combining the strike models of the smaller sub-circuits, and the combined strike model is generated by selecting a method and combining the strike models of the smaller sub-circuit pieces in accordance with the selected process. In some embodiments, a machine-learning process is used to select the selected process for combining the strike models.

In some embodiments, generating the combined strike model includes combining the circuits of the strike models of the smaller sub-circuit pieces in accordance with functional topology of the circuit piece. In some embodiments, the functional topology of the circuit piece is indicated by the layout information of the circuit piece. In some embodiments, the functional topology of the circuit piece is indicated by the gate-level netlist of the circuit piece.

In some embodiments, generating the combined strike model includes combining the circuits of the strike models of the smaller sub-circuit pieces in accordance with layout topology of the circuit piece, wherein the layout topology of the circuit piece is indicated by the layout information of the circuit piece.

In some embodiments, an accelerator engine module circuit (e.g., 761, 762) of the semiconductor design evaluation hardware system (e.g., 701, 702) decomposes the circuit piece into the plurality of smaller circuit pieces. In some embodiments, an accelerator engine module circuit (e.g., 761, 762) of the semiconductor design evaluation hardware system (e.g., 701, 702) selects the stored set of analog circuit strike models for the circuit piece and decomposes the circuit piece into the plurality of smaller circuit pieces.

In some embodiments, each combined strike model stored at the process S908 is included in the stored set of analog circuit particle strike models used in the strike model selection process S802 of the method 800. In this manner, the set of stored strike models increases as new strike models are stored during the process S908. In some embodiments, a radiation-susceptibility metric for a semiconductor circuit determined by using a first stored set of analog circuit particle strike models is different from a radiation-susceptibility metric for the semiconductor circuit determined by using a second stored set of analog circuit particle strike models that is the result of storage of additional strike models by the process S908. In some embodiments, as more strike models are stored at the process S908, radiation susceptibility metrics become more accurate.

19. Strike Models

In some embodiments, at least one analog circuit particle strike model is a model that is generated by: accessing an analog circuit representation of the corresponding circuit piece in an analog electronic circuit simulator format that includes charge voltage circuit components that represent the potential for one of charge deposition and charge sharing; accessing a weighted abstraction of a TCAD (Technology Computer Aided Design) generated energy deposition of a particle strike in a volume representation of the circuit piece, the information of the particle strike being determined by the first radiation environment information; and setting each charge voltage circuit component of the analog circuit representation to a corresponding charge voltage value of the weighted abstraction of the TCAD generated energy deposition.

In some embodiments, at least one analog circuit strike model is generated by: accessing an analog circuit representation of the corresponding circuit piece in an analog electronic circuit simulator format that includes charge voltage circuit components that represent the potential for one of charge deposition and charge sharing; accessing radiation test information for a fabricated instance of the circuit piece in a radiation environment specified by the first radiation environment information; and setting each charge voltage circuit component of the analog circuit representation to a corresponding charge voltage value of the accessed radiation test information.

20. Metrics

In some embodiments, for each selected particle strike model of a circuit piece, determining a radiation susceptibility metric by comparing functional results generated by functional simulation of the of the particle strike model with functional results generated by functional simulation of the circuit piece includes: determining stimuli data for the circuit piece at each input interface of the circuit piece; using a semiconductor design functional simulator to determine expected output values for the circuit piece by simulating functionality of the layout information of the circuit piece with the determined stimuli data for the circuit piece; for each selected particle strike model of the circuit piece, using a strike model functional simulator to determine strike model output values for the strike model by simulating functionality of the strike model with the determined stimuli for the circuit piece; and for each strike model, comparing the determined strike model output values with the expected output values for the circuit piece.

In some embodiments, for each selected particle strike model of a circuit piece, determining a radiation susceptibility metric by comparing functional results generated by functional simulation of the of the particle strike model with functional results generated by functional simulation of the circuit piece includes: determining stimuli data for the circuit piece at each input interface of the circuit piece; using a gate-level circuit functional simulator to determine expected output values for the circuit piece by simulating functionality of the circuit of the gate-level netlist of the circuit piece with the determined stimuli data for the circuit piece; for each selected particle strike model of the circuit piece, using a strike model functional simulator to determine strike model output values for the strike model by simulating functionality of the strike model with the determined stimuli for the circuit piece; and for each strike model, comparing the determined strike model output values with the expected output values for the circuit piece.

In some embodiments, determining stimuli data for the circuit piece at each input interface of the circuit piece includes: using a semiconductor design functional simulator to determine stimuli data for the circuit piece at each input interface of the circuit piece by simulating functionality of the first IC layout information with received first stimuli data for the first semiconductor circuit.

In some embodiments, determining stimuli data for the circuit piece at each input interface of the circuit piece includes: using a gate-level circuit functional simulator to determine stimuli data for the circuit piece at each input interface of the circuit piece by simulating functionality of a first gate-level netlist of the first IC layout information with received first stimuli data for the first semiconductor circuit. In some embodiments, the semiconductor design evaluation hardware system (e.g., 701, 701) receives the first gate-level netlist via a first interface module circuit (e.g., 731) of the semiconductor design evaluation hardware system, and the first gate-level netlist is a netlist of the first semiconductor circuit. In some embodiments, the semiconductor design evaluation hardware system extracts the first gate-level netlist from the first IC layout information, and the first gate-level netlist is a netlist of the first semiconductor circuit.

In some embodiments, functional simulation of the of the particle strike model and functional simulation of the circuit piece are performed by using received circuit operating parameters for the semiconductor circuit of the first IC layout information. In some embodiments, the received circuit operating parameters include at least one of voltage and temperature parameters.

In some embodiments, for each circuit piece, determining a radiation susceptibility metric for the circuit piece based on the radiation susceptibility metrics generated for each selected particle strike model of the circuit piece includes: determining a radiation susceptibility metric for the circuit piece based on the radiation susceptibility metrics generated for each selected particle strike model of the circuit piece by using probability calculations.

In some embodiments, determining a radiation-susceptibility metric for a first semiconductor circuit corresponding to the first IC layout information by combining the determined radiation-susceptibility metrics for the plurality of circuit pieces includes: determining a radiation-susceptibility metric for a first semiconductor circuit corresponding to the first IC layout information by combining the determined radiation-susceptibility metrics for the plurality of circuit pieces based on proximity of the circuit pieces within an area of the placed and routed design of first IC layout information, by using probability calculations.

In some embodiments, determining a radiation-susceptibility metric for a first semiconductor circuit corresponding to the first IC layout information by combining the determined radiation-susceptibility metrics for the plurality of circuit pieces includes: determining a radiation-susceptibility metric for a first semiconductor circuit corresponding to the first IC layout information by combining the determined radiation-susceptibility metrics for the plurality of circuit pieces based on proximity of the circuit pieces as indicated by layout topology indicated by the first IC layout information, by using probability calculations.

In some embodiments, the semiconductor design evaluation hardware system (e.g., 701, 702) determines a Soft Error Rate (SER) value and a Failure In Time (FIT) value from the overall radiation-susceptibility metric for the first semiconductor circuit.

In some embodiments, the semiconductor design evaluation hardware system determines a Soft Error Rate (SER) value and a Failure In Time (FIT) value from the overall radiation-susceptibility metric for the first semiconductor circuit by using a Bayesian model.

21. System Architecture

FIG. 10 is an architecture diagram of a semiconductor design evaluation hardware system in accordance with embodiments.

In some embodiments, the semiconductor design evaluation hardware system 1000 is implemented as a single hardware server device 1000. In some embodiments, the semiconductor design evaluation hardware system 1000 is implemented as a plurality of hardware devices similar to the hardware server device 1000 of FIG. 10.

In some embodiments, the semiconductor design evaluation hardware system 1000 includes a bus 1001 that interfaces with the processors 1001A-1001N, the main memory (e.g., a random access memory (RAM)) 1022, a read only memory (ROM) 1004, a processor-readable storage medium 1005, and a network device 1011. In some embodiments, the semiconductor design evaluation hardware system 1000 includes at least one of a display device and a user input device. In some embodiments, the device 1000 includes one processor (e.g., 1001A).

The processors 1001A-1001N may take many forms, such as one or more of a microcontroller, a CPU (Central Processing Unit), a GPU (Graphics Processing Unit), and the like. In some embodiments, the semiconductor design evaluation hardware system 1000 includes at least one of a central processing unit (processor), a GPU, and a multi-processor unit (MPU).

The processors 1001A-1001N and the main memory 1022 form a processing unit 1099. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip).

The network adapter device 1011 provides one or more wired or wireless interfaces for exchanging data and commands between the system 1000 and other devices, such as an operator device. Such wired and wireless interfaces include, for example, a universal serial bus (USB) interface, Bluetooth interface, Wi-Fi interface, Ethernet interface, InfiniBand interface, Fibre Channel interface, near field communication (NFC) interface, and the like.

Machine-executable instructions in software programs (such as an operating system, application programs, and device drivers) are loaded into the memory 1022 (of the processing unit 1099) from the processor-readable storage medium 1005, the ROM 1004 or any other storage location. During execution of these software programs, the respective machine-executable instructions are accessed by at least one of processors 1001A-1001N (of the processing unit 1099) via the bus 1001, and then executed by at least one of processors 1001A-1001N. Data used by the software programs are also stored in the memory 1022, and such data is accessed by at least one of processors 1001A-1101N during execution of the machine-executable instructions of the software programs. The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

The processor-readable storage medium 1005 includes machine-executable instructions (and related data) for an operating system 1012, software programs 1013, and device drivers 1014. In some embodiments, the storage medium 1005 includes stored sets of analog circuit particle strike models 1015. In some embodiments, each set of strike models is stored in association with a respective gate-level netlist and respective layout information. In some embodiments, the storage medium 1005 includes machine-executable instructions for a semiconductor design evaluation module 1016. In some embodiments, the evaluation module 1016 is constructed to perform the method of FIG. 5. In some embodiments, the evaluation module 1016 is constructed to perform the method of FIG. 6. In some embodiments, the evaluation module 1016 is constructed to perform the method 800. In some embodiments, the evaluation module 1016 is constructed to perform the method of FIG. 9. In some embodiments, the evaluation module includes a semiconductor design functional simulator. In some embodiments, the evaluation module includes a gate-level circuit functional simulator.

22. Machines

Systems and methods of embodiments and variations thereof can be embodied and/or implemented at least in part as a machine configured to receive a computer-readable medium storing computer-readable instructions. The instructions are preferably executed by computer-executable components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

23. Conclusion

As a person skilled in the art will recognize from the previous detailed description and from the figures and claims, modifications and changes can be made to the preferred embodiments of the disclosure without departing from the scope of this disclosure defined in the following claims.

What is claimed is:

1. A semiconductor design evaluation hardware system, comprising:
a first hardware compute accelerator constructed to:
store a plurality of sets of analog circuit particle strike models, each set being stored in association with respective layout information and radiation environment information, wherein each particle strike model has charge voltage circuit components with radiation susceptibility charge voltage values corresponding to a respective particle strike of a radiation environment identified by the radiation environment information, and wherein each particle strike model corresponds to a different particle strike of the radiation environment;

select a set of analog circuit particle strike models based on IC (integrated circuit) layout information and radiation environment information received for a placed and routed circuit design via a network;

generate first functional results by performing functional simulation of the particle strike models of the selected set;

generate second functional results by performing functional simulation of at least a portion of the placed and routed circuit design; and generate a radiation susceptibility metric for the placed and routed circuit design by comparing the first functional results with the second functional results.

2. The system of claim 1, wherein the first hardware compute accelerator is constructed to provide the radiation susceptibility metric to an external operator device via the network.

* * * * *